(12) United States Patent
Seon

(10) Patent No.: US 12,479,506 B2
(45) Date of Patent: Nov. 25, 2025

(54) VEHICLE UNDERCOVER STRUCTURE

(71) Applicants: Hyundai Motor Company, Seoul (KR); Kia Corporation, Seoul (KR)

(72) Inventor: Dong Ku Seon, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 569 days.

(21) Appl. No.: 17/968,892

(22) Filed: Oct. 19, 2022

(65) Prior Publication Data

US 2024/0010279 A1     Jan. 11, 2024

(30) Foreign Application Priority Data

Jul. 7, 2022 (KR) .................. 10-2022-0083766

(51) Int. Cl.
    B62D 21/15     (2006.01)

(52) U.S. Cl.
    CPC .................. B62D 21/155 (2013.01)

(58) Field of Classification Search
    CPC ....... B62D 21/155; B62D 25/20; B62D 35/02
    See application file for complete search history.

(56) References Cited

U.S. PATENT DOCUMENTS

| | | | | |
|---|---|---|---|---|
| 4,569,551 A * | 2/1986 | Rauser | .................. | B62D 35/02 |
| | | | | 296/180.1 |
| 6,726,273 B2 * | 4/2004 | Kruschhausen | ... | B62D 25/2072 |
| | | | | 180/69.1 |
| 8,746,782 B2 * | 6/2014 | Naoi | .................. | B62D 25/2072 |
| | | | | 296/180.1 |
| 8,814,251 B2 * | 8/2014 | Matsuyama | .......... | B62D 25/20 |
| | | | | 296/180.1 |
| 9,505,446 B2 * | 11/2016 | Ideshio | .................. | B60K 17/00 |
| 2018/0148100 A1 * | 5/2018 | Nakagawa | ............ | B62D 35/02 |
| 2023/0063716 A1 * | 3/2023 | Seon | ..................... | B62D 21/09 |

FOREIGN PATENT DOCUMENTS

JP     2021183439 A   *   12/2021

OTHER PUBLICATIONS

Translation of JP-2021183439-A (Year: 2021).*

* cited by examiner

Primary Examiner — Katy M Ebner
(74) Attorney, Agent, or Firm — SLATER MATSIL, LLP

(57) ABSTRACT

An embodiment vehicle undercover structure includes a chassis frame, a moving component that is movable up and down below the chassis frame, and a first undercover connected to the chassis frame and located above the moving component, wherein the first undercover includes a first bottom wall, a first recessed wall recessed from the first bottom wall toward the chassis frame, wherein the first recessed wall is designed to not interfere with a movement path of the moving component, and a pair of first side walls extending from both side edges of the first bottom wall and both side edges of the first recessed wall toward the chassis frame, respectively.

19 Claims, 20 Drawing Sheets

VEHICLE UNDERCOVER STRUCTURE

CROSS-REFERENCE TO RELATED APPLICATIONS

This application claims the benefit of Korean Patent Application No. 10-2022-0083766, filed on Jul. 7, 2022, which application is hereby incorporated herein by reference.

TECHNICAL FIELD

The present disclosure relates to a vehicle undercover structure.

BACKGROUND

A vehicle includes a chassis frame, and the chassis frame has a pair of side rails extending along a longitudinal direction of the vehicle. A powertrain system including various powertrain components such as a prime mover (an internal combustion engine, an electric motor, etc.) and a transmission may be mounted on the chassis frame, and lower portions of the powertrain components may be exposed below the chassis frame.

In addition, the vehicle includes an axle beam connected to the chassis frame through a pair of leaf springs, and a pair of knuckles may be connected to both ends of the axle beam. Each knuckle may be equipped with a wheel hub. Both ends of a tie rod may be connected to the pair of knuckles through a pair of tie rod arms, respectively. That is, the tie rod may be connected to the axle beam through the pair of knuckles. During the driving of the vehicle, when bump steer occurs, the axle beam and the tie rod may move up and down along a predetermined movement path through the pair of leaf springs. For example, the axle beam and the tie rod may move up and down due to the bump steer and/or the like.

In addition, an undercover may be provided to protect the lower portions of various powertrain components of the powertrain system. The undercover may be mounted on the chassis frame to cover the lower portions of the powertrain components exposed below the chassis frame, and accordingly the undercover may prevent foreign objects, moisture, etc. from entering the lower portions of the powertrain components. The undercover may have a tunnel shape surrounding the lower portions of the powertrain components exposed below the chassis frame, and the undercover may be mounted on the chassis frame through a plurality of mounting brackets.

In an existing vehicle according to the related art, the undercover may not be disposed above the axle beam and the tie rod so as to secure the movement paths of the axle beam and the tie rod. Accordingly, the lower portions of some powertrain components located above the axle beam and the tie rod may not be protected from moisture, foreign objects, etc. For example, a semi-truck with an internal combustion engine has an oil pan located on a lower portion of the internal combustion engine, and the axle beam and the tie rod may be configured to move up and down below the oil pan. In order to mount the undercover protecting the bottom of the oil pan, when the axle beam is in an upper limit position, a clearance between the axle beam and the undercover should be 20 mm, and a clearance between the undercover and a bottom surface of the oil pan should be 20 mm. Accordingly, in order for the undercover to be mounted on the movement path of the axle beam, a clearance between the axle beam located in the upper limit position and the bottom surface of the oil pan should be a total of 40 mm. When the undercover is located above the axle beam, it may limit the movement path of the axle beam, and accordingly suspension characteristics of the vehicle may not be satisfied.

In the existing vehicle according to the related art, the undercover may not be disposed above the axle beam and the tie rod so as to secure the movement paths of the axle beam and the tie rod. Since the undercover is not disposed above the axle beam and the tie rod, moisture or foreign objects (e.g., calcium chloride which is a snow removal material used in winter) may be scattered by wheels onto the lower portions of some powertrain components (e.g., the oil pan) adjacent to the movement path of the axle beam. Accordingly, the lower portions of the powertrain components may be severely damaged by the scattered moisture or foreign objects, which may result in poor quality of rust prevention and customer complaints.

The above information described in this background section is provided to assist in understanding the background of the inventive concept, and may include any technical concept which is not considered as the prior art that is already known to those skilled in the art.

SUMMARY

The present disclosure relates to a vehicle undercover structure. Particular embodiments relate to a vehicle undercover structure designed to cover a lower portion of a powertrain component exposed below a chassis frame without interfering with a moving component which is movable below the chassis frame.

Embodiments of the present disclosure can solve problems occurring in the prior art while advantages achieved by the prior art are maintained intact.

An embodiment of the present disclosure provides a vehicle undercover structure that covers a lower portion of a powertrain component adjacent to a moving component which is movable up and down below a chassis frame and is designed to not interfere with a movement path of the moving component.

According to an embodiment of the present disclosure, a vehicle undercover structure may include a chassis frame, a moving component which is movable up and down below the chassis frame, and a first undercover which is connected to the chassis frame and is located above the moving component. As the first undercover is located above the moving component, it may safely protect a lower portion of a powertrain component mounted on the chassis frame, and accordingly the lower portion of the powertrain component adjacent to the moving component may be protected from moisture, foreign objects, etc. by the first undercover. Thus, the quality of rust prevention with respect to the lower portion of the powertrain component and noise prevention achieved by the first undercover may be improved.

The first undercover may include a first bottom wall, a first recessed wall which is recessed from the first bottom wall toward the chassis frame, and a pair of first side walls which extend from both side edges of the first bottom wall and both side edges of the first recessed wall toward the chassis frame, respectively. The first recessed wall may be designed to not interfere with a movement path of the moving component. Accordingly, the first undercover may not interfere with the movement path of the moving component due to the first recessed wall. Thus, the first undercover may secure the movement path of the moving component while protecting the lower portion of the powertrain component exposed below the chassis frame from moisture, foreign objects, etc.

The first recessed wall may have a first opening which is aligned with the movement path of the moving component. As the first undercover has the first opening aligned with the movement path of the moving component, the moving component may not come into contact with the first undercover when the moving component is in its upper limit position.

The vehicle undercover structure may further include a powertrain component which is mounted on the chassis frame. The lower portion of the powertrain component may be exposed below the chassis frame, and at least a portion of a bottom surface of the lower portion of the powertrain component may be aligned with the first opening. As at least a portion of the bottom surface of the lower portion of the powertrain component is aligned with the first opening of the first undercover, the moving component may not come into contact with the bottom surface of the lower portion of the powertrain component, and the other portions of the powertrain component excepting at least a portion of the bottom surface of the lower portion of the powertrain component may be covered with the first undercover, and accordingly the lower portion of the powertrain component located above the moving component may be protected from moisture, foreign objects, etc.

A width of the first recessed wall may be less than a distance between top edges of the pair of first side walls, and each first side wall may be stepped from the top edge thereof toward the first recessed wall. Accordingly, a width of a lower portion of the first undercover may be less than that of an upper portion of the first undercover. Thus, the first undercover may be easily inserted and mounted in a narrow space between the powertrain component and a suspension component (e.g., leaf spring), and may not interfere with the movement of the suspension component.

Each first side wall may have a stair form which is stepped from a top edge thereof to the first recessed wall, and the stair form may have a plurality of risers and a plurality of treads. As the first side wall has the stair form having the plurality of risers and the plurality of treads, stiffness of the periphery of the first opening and side stiffness of the first undercover may be improved.

The first recessed wall may further include a rear opening which is spaced apart from the first opening and is located behind the first opening and a reinforcing rib which extends in a width direction of the first recessed wall between the first opening and the rear opening. The first recessed wall may have the rear opening which does not interfere with a movement path of another moving component (e.g., a tie rod), and the reinforcing rib may extend in the width direction of the first recessed wall between the first opening and the rear opening, thereby improving stiffness with respect to the periphery of the first opening and the periphery of the rear opening, and preventing the shaking, vibration, and the like of the first undercover while the vehicle is driving.

The vehicle undercover structure may further include a second undercover which is connected to a front portion of the first undercover, and a rear portion of the second undercover may be overlapped with the front portion of the first undercover. As the second undercover is at least partially overlapped with the front portion of the first undercover, it may entirely cover the powertrain component located above the moving component.

An overlapped section between the front portion of the first undercover and the rear portion of the second undercover may be connected to the chassis frame through a mounting bracket. As the overlapped section between the front portion of the first undercover and the rear portion of the second undercover is connected to the chassis frame through the mounting bracket, connection stiffness between the first undercover and the second undercover may be improved, and the first undercover and the second undercover may be firmly mounted on the chassis frame.

The mounting bracket may include a cover-side attachment portion which is attached to the overlapped section through a cover-side fastener and a chassis-side attachment portion which is attached to the chassis frame through a chassis-side fastener. The cover-side fastener may be spaced apart from a front end of the first undercover by a predetermined marginal distance. Accordingly, even when the mounting positions of chassis components change according to the specifications of vehicles, the mounting bracket may be prevented from interfering with the chassis components due to the predetermined marginal distance, which may facilitate access of fastening tools.

The second undercover may include a second bottom wall, a second recessed wall which is recessed from the second bottom wall toward the chassis frame, and a pair of second side walls which extend from both side edges of the second bottom wall and both side edges of the second recessed wall toward the chassis frame, respectively. The second recessed wall may be designed to not interfere with the movement path of the moving component. Accordingly, the second undercover may not interfere with the movement path of the moving component due to the second recessed wall. Thus, the second undercover may secure the movement path of the moving component while protecting the lower portion of the powertrain component exposed below the chassis frame from moisture, foreign objects, etc.

The second recessed wall may have a second opening which is aligned with the movement path of the moving component. As the second undercover has the second opening aligned with the movement path of the moving component, the moving component may not come into contact with the second undercover when the moving component is in its upper limit position.

A width of the second recessed wall may be less than a distance between top edges of the pair of second side walls, and each second side wall may be stepped from the top edge thereof toward the second recessed wall. Accordingly, a width of a lower portion of the second undercover may be less than that of an upper portion of the second undercover. Thus, the second undercover may be easily inserted and mounted in a narrow space between the powertrain component and the suspension component (e.g., leaf spring), and may not interfere with the movement of the suspension component.

Each second side wall may have a stair form which is stepped from a top edge thereof to the second recessed wall, and the stair form may have a plurality of risers and a plurality of treads. As the second side wall has the stair form having the plurality of risers and the plurality of treads, stiffness of the periphery of the second opening and side stiffness of the second undercover may be improved.

The vehicle undercover structure may further include a third undercover which is connected to a rear portion of the first undercover, and a front portion of the third undercover may be at least partially overlapped with the rear portion of the first undercover. As the third undercover is connected to the rear portion of the first undercover in an overlapped manner, it may cover various powertrain components.

An overlapped section between the front portion of the third undercover and the rear portion of the first undercover may be connected to the chassis frame through a mounting bracket. As the overlapped section between the front portion of the third undercover and the rear portion of the first undercover is connected to the chassis frame through the mounting bracket, connection stiffness between the third undercover and the first undercover may be improved, and the first undercover and the third undercover may be firmly mounted on the chassis frame.

The mounting bracket may include a cover-side attachment portion which is attached to the overlapped section through a cover-side fastener and a chassis-side attachment portion which is attached to the chassis frame through a chassis-side fastener. The cover-side fastener may be spaced apart from a rear end of the first undercover by a predetermined marginal distance. Accordingly, even when the mounting positions of chassis components change according to the specifications of vehicles, the mounting bracket may be prevented from interfering with the chassis components due to the predetermined marginal distance, which may facilitate access of fastening tools.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
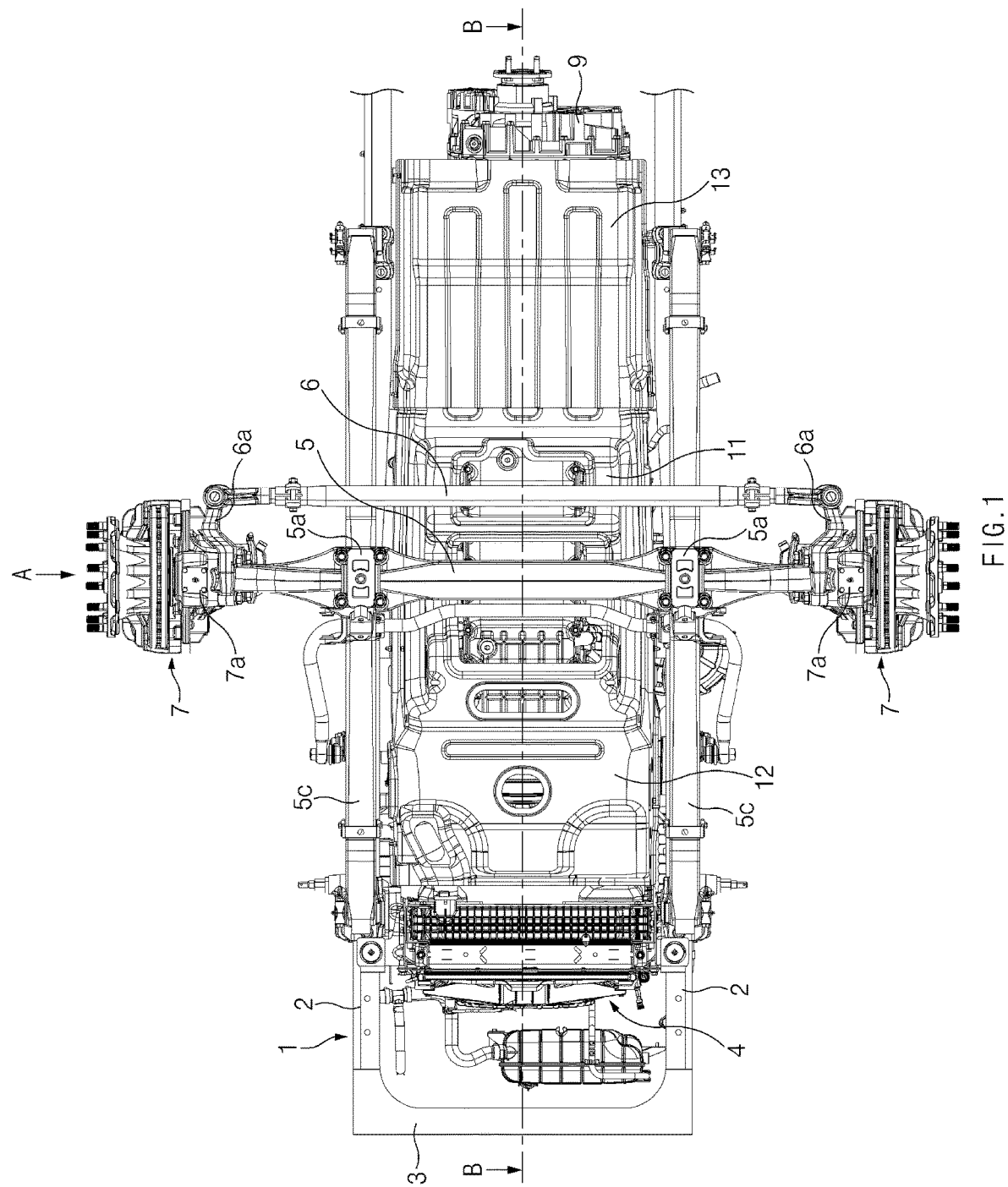
FIG. 1 illustrates a bottom view of a vehicle undercover structure according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with embodiments of the present disclosure will be omitted in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle undercover structure according to an exemplary embodiment of the present disclosure may include a chassis frame 1 and a first undercover 11 connected to the chassis frame 1.

The chassis frame 1 may include a pair of side rails 2 spaced apart from each other in a width direction of the vehicle, and at least one crossmember 3 connecting the pair of side rails 2. The pair of side rails 2 may face each other in the width direction of the vehicle, and the front crossmember 3 may connect front ends of the side rails 2.

Figure 2:
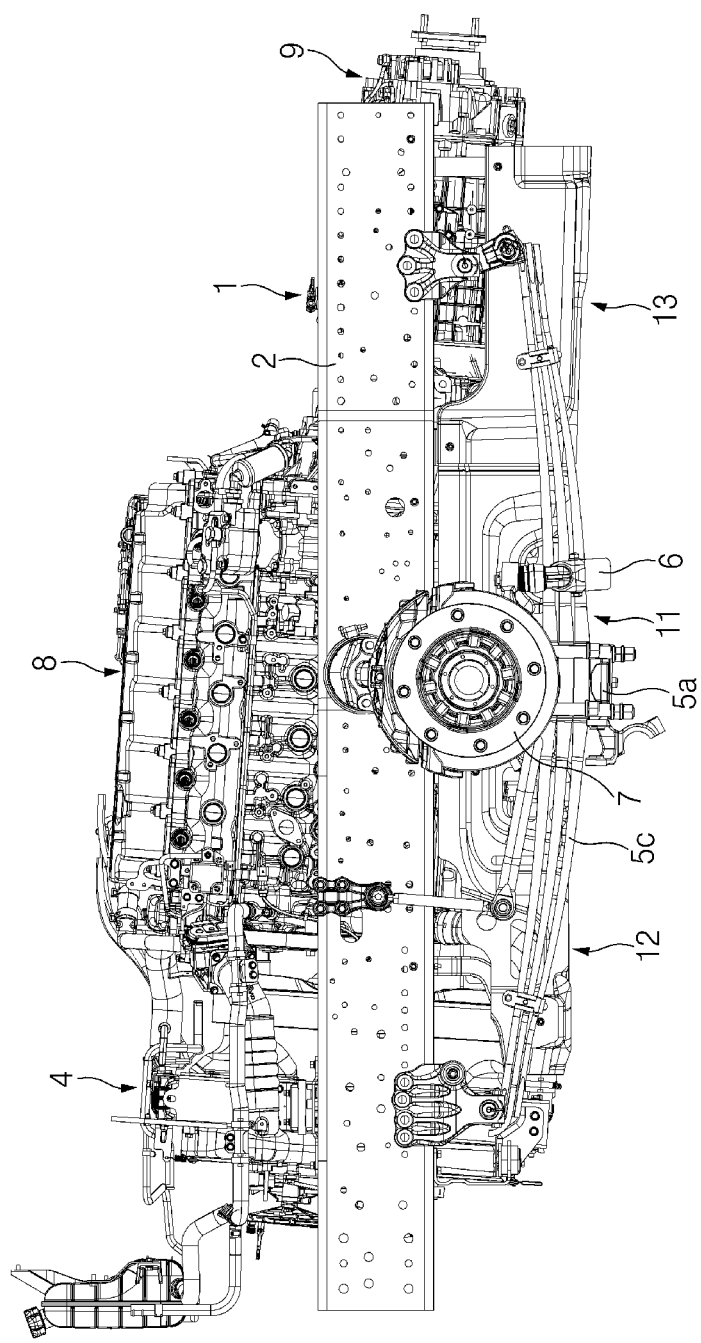
FIG. 2 illustrates a view which is viewed in a direction indicated by arrow A of FIG. 1.

Referring to FIGS. 1 and 2, each side rail 2 may extend in a longitudinal direction of the vehicle. The side rail 2 may be a beam having a C-shaped or I-shaped cross section.

According to an exemplary embodiment, the chassis frame 1 may be a chassis frame of a semi-truck. Various components may be mounted on the chassis frame 1 through brackets and/or the like. In particular, various components may be located between the pair of side rails 2. For example, various components may include a radiator and powertrain components (an internal combustion engine, a transmission, etc.) of a powertrain system of a semi-truck. Referring to FIG. 2, the powertrain components may be an internal combustion engine 8, a transmission 9, and the like. A radiator 4 may be located in front of the internal combustion engine 8, and the transmission 9 may be located behind the internal combustion engine 8. A lower portion of the radiator 4, a lower portion of the internal combustion engine 8, and a lower portion of the transmission 9 may be exposed below the chassis frame 1.

Figure 3:
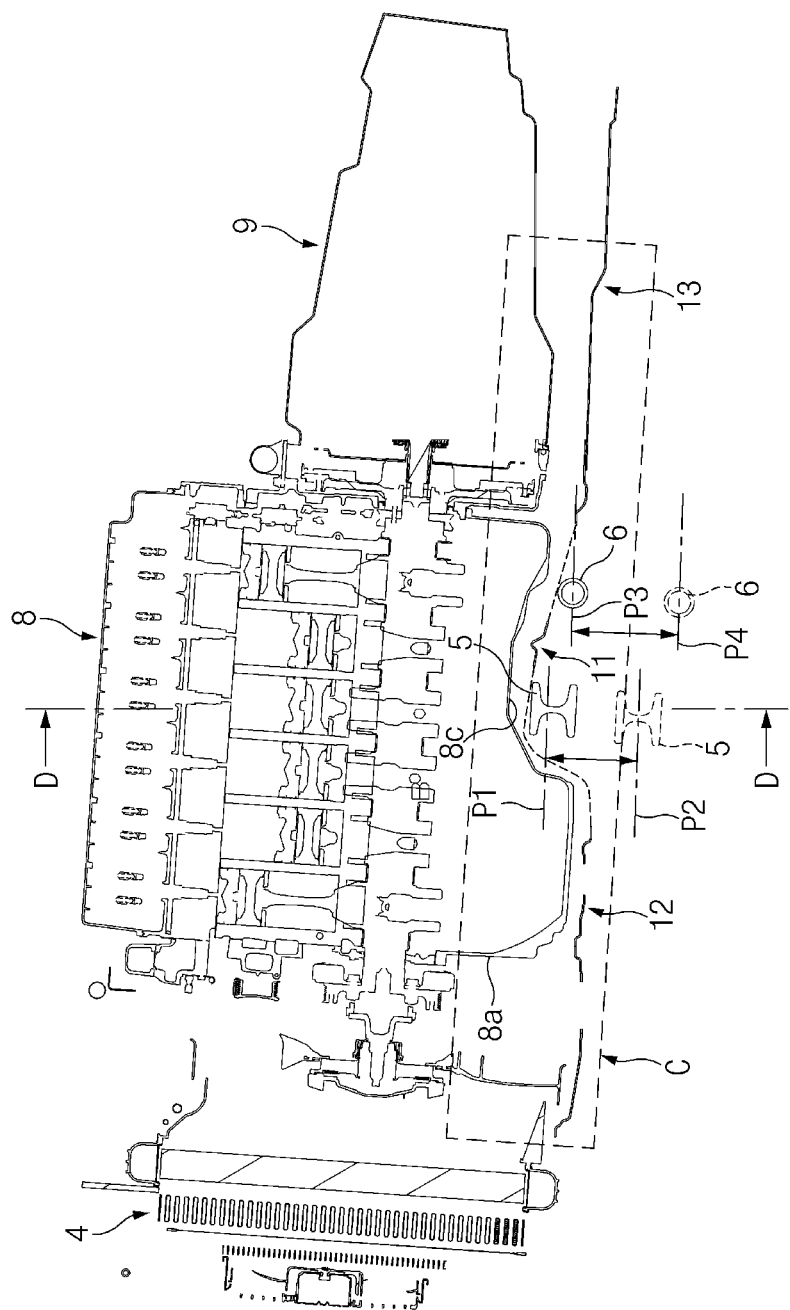
FIG. 3 illustrates a cross-sectional view, taken along line B-B of FIG. 1.

Referring to FIG. 1, an axle beam 5 may be connected to the side rails 2 of the chassis frame 1 through a pair of leaf springs 5c. The axle beam 5 may have a pair of spring seats 5a, and each leaf spring 5c may be mounted on the corresponding spring seat 5a of the axle beam 5. Both ends of each leaf spring 5c may be mounted on the corresponding side rail 2. During the driving of the vehicle, when bump steer occurs, the axle beam 5 may bump or rebound through the pair of leaf springs 5c. That is, the axle beam 5 may move up and down along a predetermined movement path through the pair of leaf springs 5c below the chassis frame 1. Referring to FIG. 3, the axle beam 5 may move between a first upper limit position P1 and a first lower limit position P2.

Referring to FIG. 1, a pair of knuckles 7a may be connected to both ends of the axle beam 5, respectively, and a pair of wheel hubs 7 may be mounted on the pair of knuckles 7a, respectively. Both ends of a tie rod 6 may be connected to the pair of knuckles 7a through a pair of tie rod arms 6a, respectively. The tie rod 6 may be connected to the axle beam 5 through the pair of knuckles 7a so that the tie rod 6 may move up and down together with the axle beam 5. Referring to FIG. 3, the tie rod 6 may move between a second upper limit position P3 and a second lower limit position P4. When the axle beam 5 moves to the first upper limit position P1, the tie rod 6 may move to the second upper limit position P3, and when the axle beam 5 moves to the first lower limit position P2, the tie rod 6 may move to the second lower limit position P4.

As described above, the moving components such as the axle beam 5 and the tie rod 6 may move up and down along their predetermined movement paths below the chassis frame 1, and the powertrain component located above the moving components may be prevented from interfering with the movement paths of the moving components. Even when each moving component is in its upper limit position, the moving component may not come into contact with the powertrain component.

Referring to FIG. 3, the powertrain component located above the moving components may be the internal combustion engine 8, and the internal combustion engine 8 may include an oil pan 8a provided on the lower portion thereof. The oil pan 8a may be configured to receive engine lubricating oil for lubrication, cooling, and cleaning of the internal combustion engine. The oil pan 8a may have a recessed surface 8c. The recessed surface 8c of the oil pan 8a may be aligned with the moving components such as the axle beam 5 and the tie rod 6, and the recessed surface 8c of the oil pan 8a may not interfere with the movement path of each moving component (that is, the movement path of the axle beam 5 and the movement path of the tie rod 6). Even when the axle beam 5 is in the first upper limit position P1 and the tie rod 6 is in the second upper limit position P3, the axle beam 5 and the tie rod 6 may not directly contact the recessed surface 8c of the oil pan 8a.

First Undercover

Figure 8:
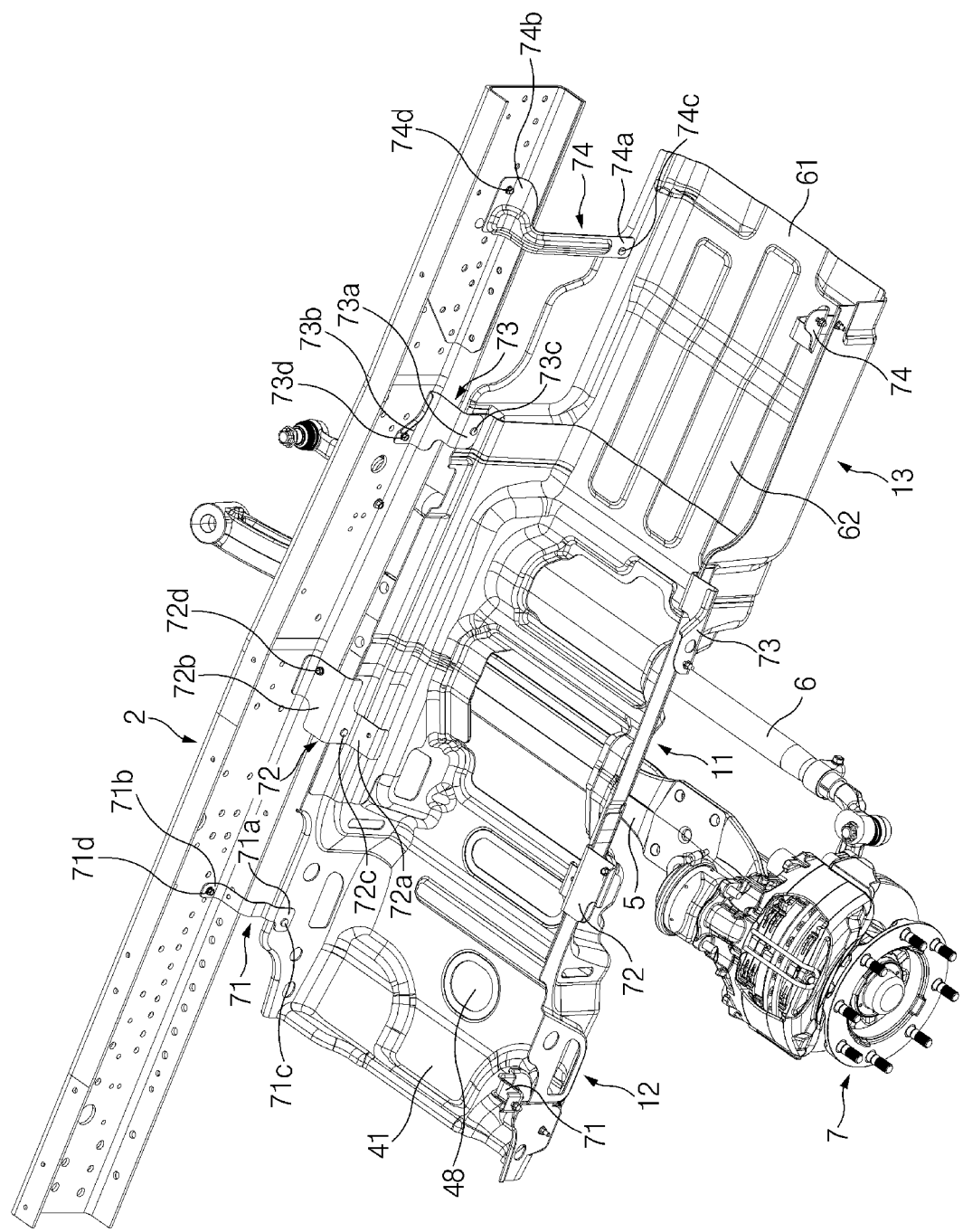
FIG. 8 illustrates a top perspective view of a state in which a first undercover, a second undercover, and a third undercover are connected to a side sill in a vehicle undercover structure according to an exemplary embodiment of the present disclosure.
Figure 9:
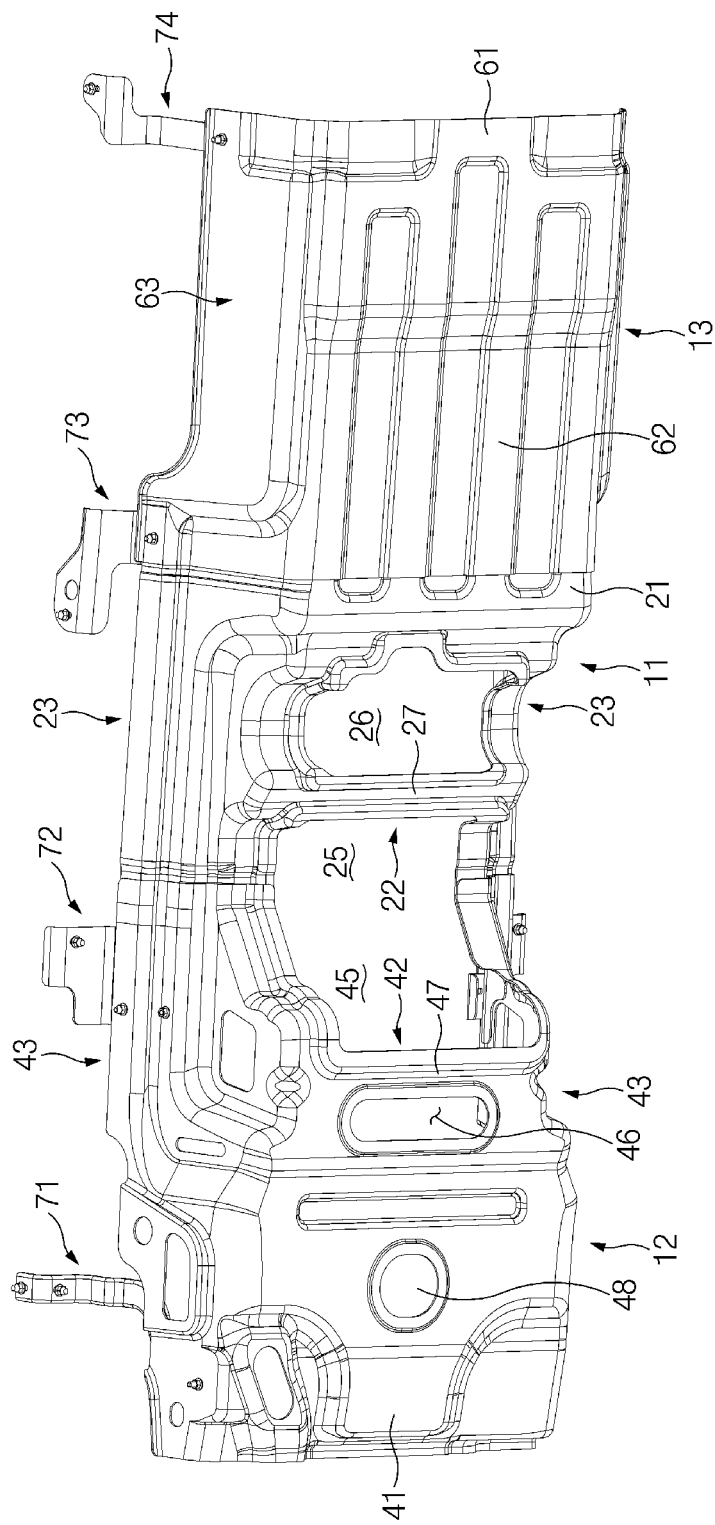
FIG. 9 illustrates a bottom perspective view of a first undercover, a second undercover, and a third undercover in a vehicle undercover structure according to an exemplary embodiment of the present disclosure.
Figure 10:
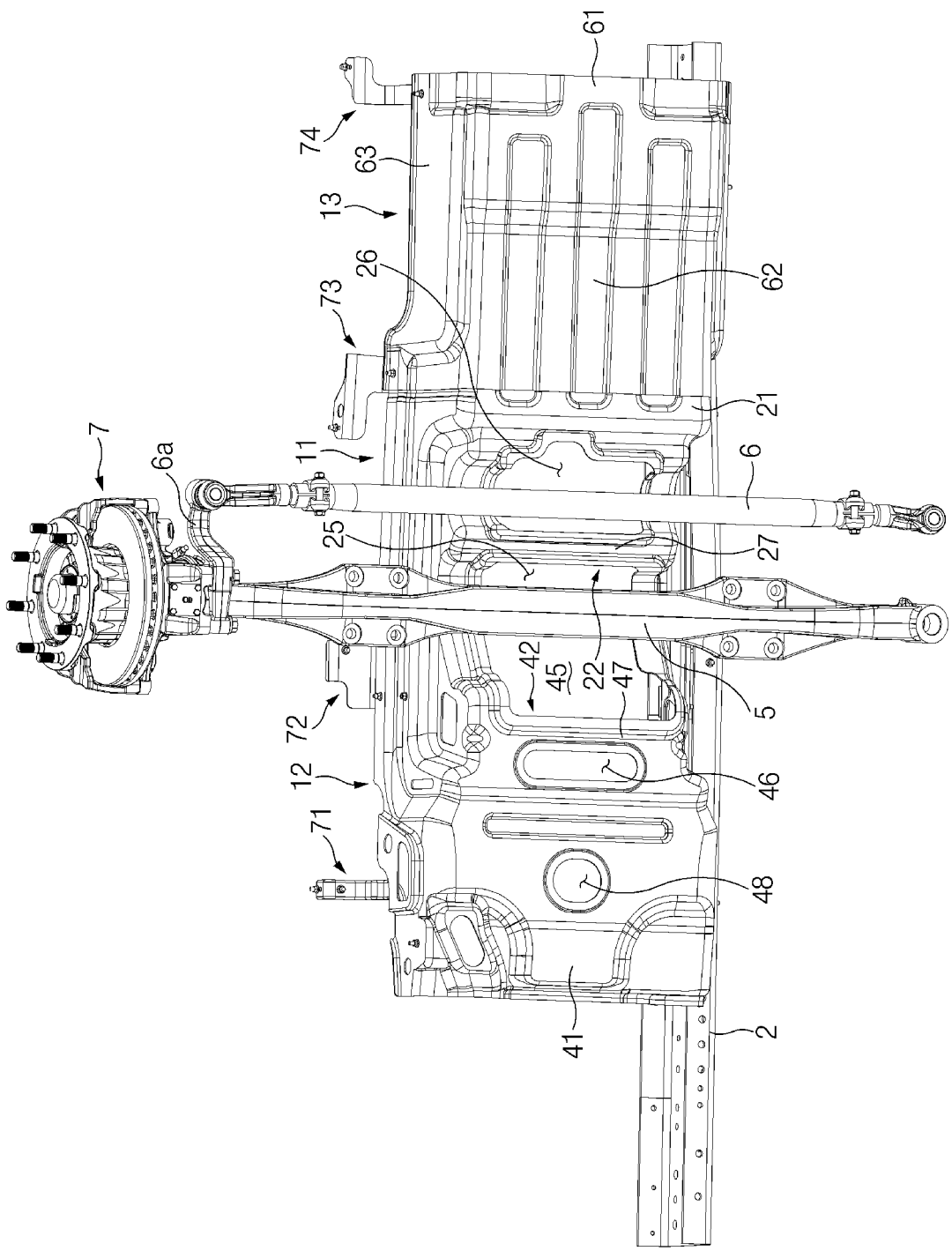
FIG. 10 illustrates a bottom perspective view of a state in which a first undercover, a second undercover, and a third undercover are connected to a side sill in a vehicle undercover structure according to an exemplary embodiment of the present disclosure.

Referring to FIG. 8, a first undercover 11 may be located below the chassis frame 1 and be connected to the side rails 2 of the chassis frame 1 through brackets 72 and 73.

The first undercover 11 may cover the lower portion of the powertrain component exposed below the chassis frame 1. Referring to FIGS. 3 to 6, the first undercover 11 may cover the oil pan 8a of the internal combustion engine 8.

The first undercover 11 may be located above the moving components such as the axle beam 5 and the tie rod 6. Accordingly, the first undercover 11 may cover the lower portion (the oil pan) of the powertrain component (the internal combustion engine) located above the moving components.

The first undercover 11 may have a shape which is complementary to that of the lower portion of the powertrain component so as not to interfere with the movement path of each moving component. Referring to FIG. 3, the shape of the first undercover 11 may be complementary to that of the recessed surface 8c of the oil pan 8a of the internal combustion engine 8.

A front portion of the first undercover 11 may face the front of the vehicle, and a rear portion of the first undercover 11 may face the rear of the vehicle.

Figure 11:
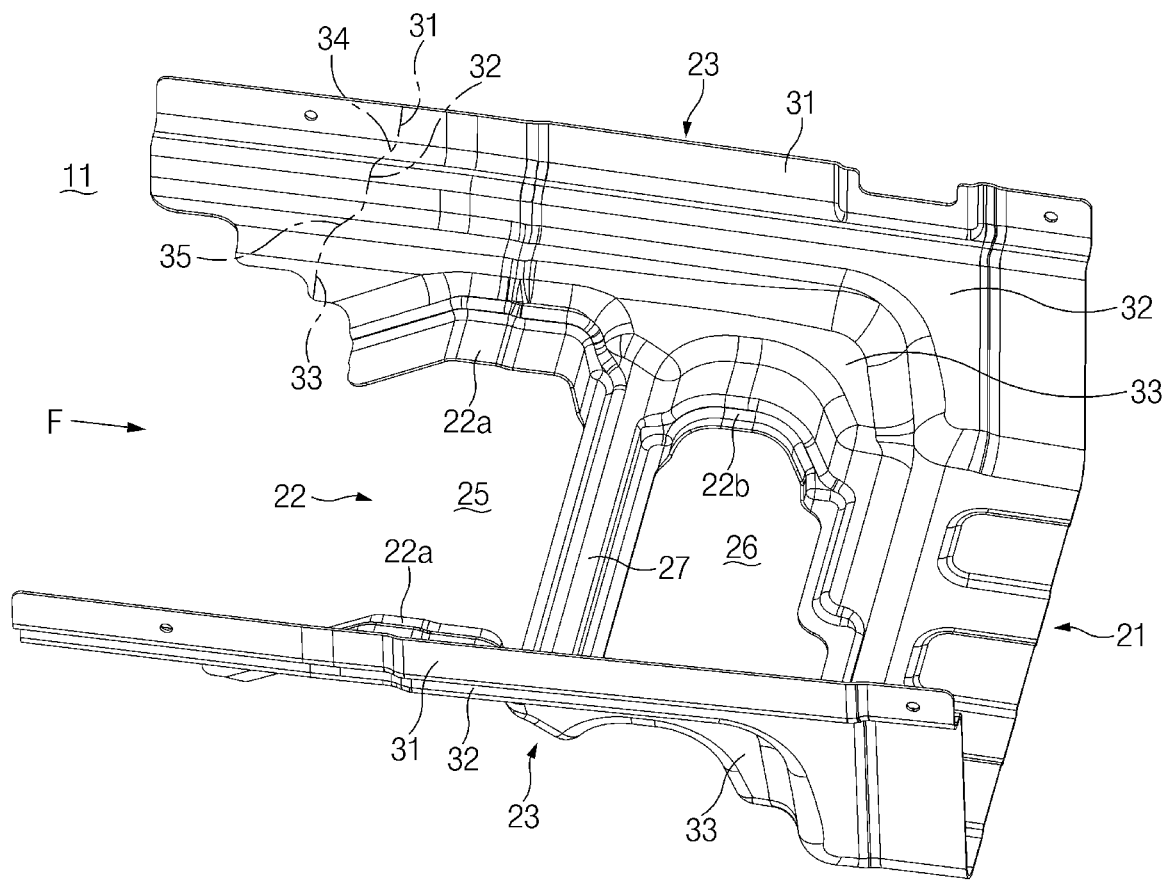
FIG. 11 illustrates a perspective view of a first undercover of a vehicle undercover structure according to an exemplary embodiment of the present disclosure.
Figure 12:
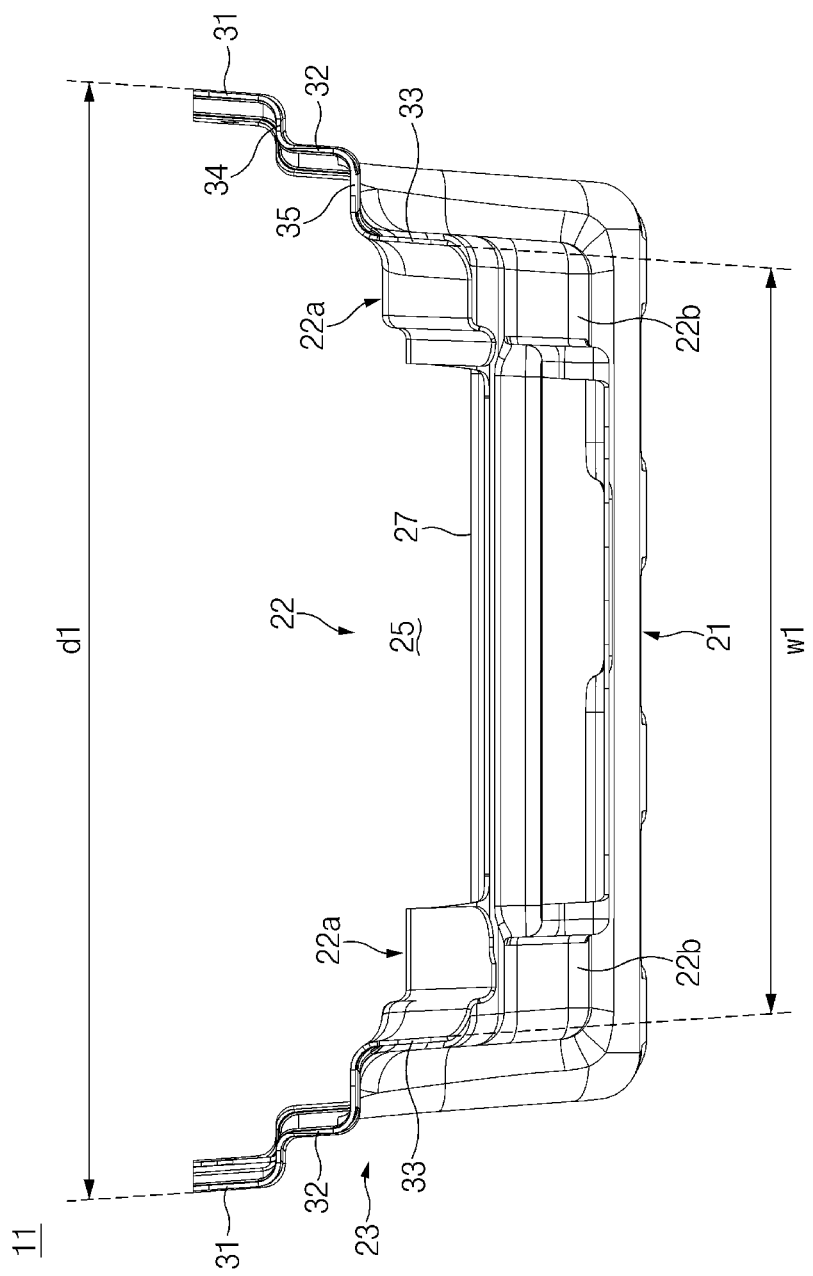
FIG. 12 illustrates a view which is viewed in a direction indicated by arrow F of FIG. 11.

Referring to FIGS. 11 and 12, the first undercover 11 may include a first bottom wall 21, a first recessed wall 22 recessed upwardly from the first bottom wall 21, and a pair of first side walls 23 extending upwardly from both side edges of the first bottom wall 21 and both side edges of the first recessed wall 22.

Referring to FIG. 11, the first bottom wall 21 may be flat. The first bottom wall 21 may be provided on the rear portion of the first undercover 11, and the first recessed wall 22 may be provided on the front portion of the first undercover 11 so that the first recessed wall 22 may be located in front of the first bottom wall 21. The first recessed wall 22 may be recessed upwardly from the first bottom wall 21 toward the chassis frame 1 so that the first recessed wall 22 may be located higher than the first bottom wall 21.

The first recessed wall 22 may have a first opening 25, and the first opening 25 may be aligned with the movement path of the axle beam 5. As the first opening 25 is aligned with the movement path of the axle beam 5, the axle beam 5 may not come into contact with the first undercover 11 when the axle beam 5 is in the first upper limit position P1. That is, the first opening 25 may reliably prevent the axle beam 5 from coming into contact with the first undercover 11.

Figure 4:
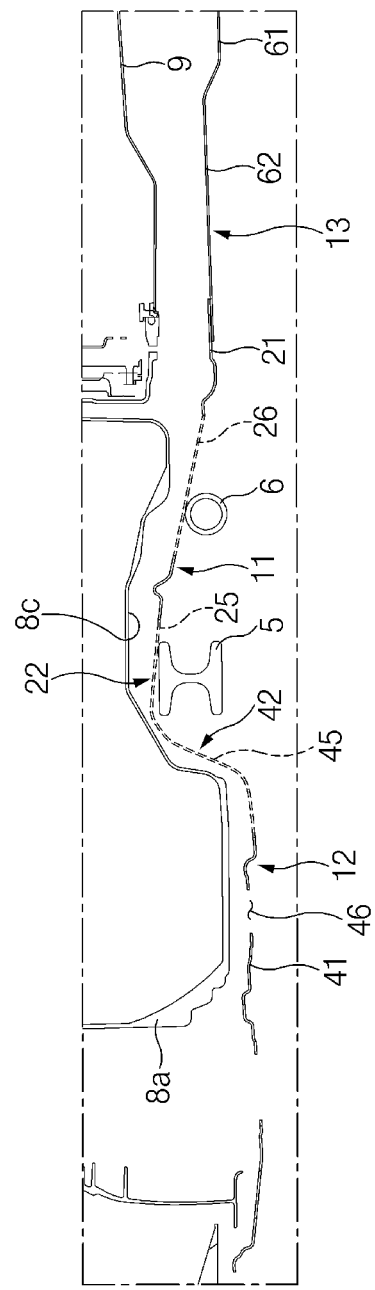
FIG. 4 illustrates an enlarged view of portion C of FIG. 3.
Figure 5:
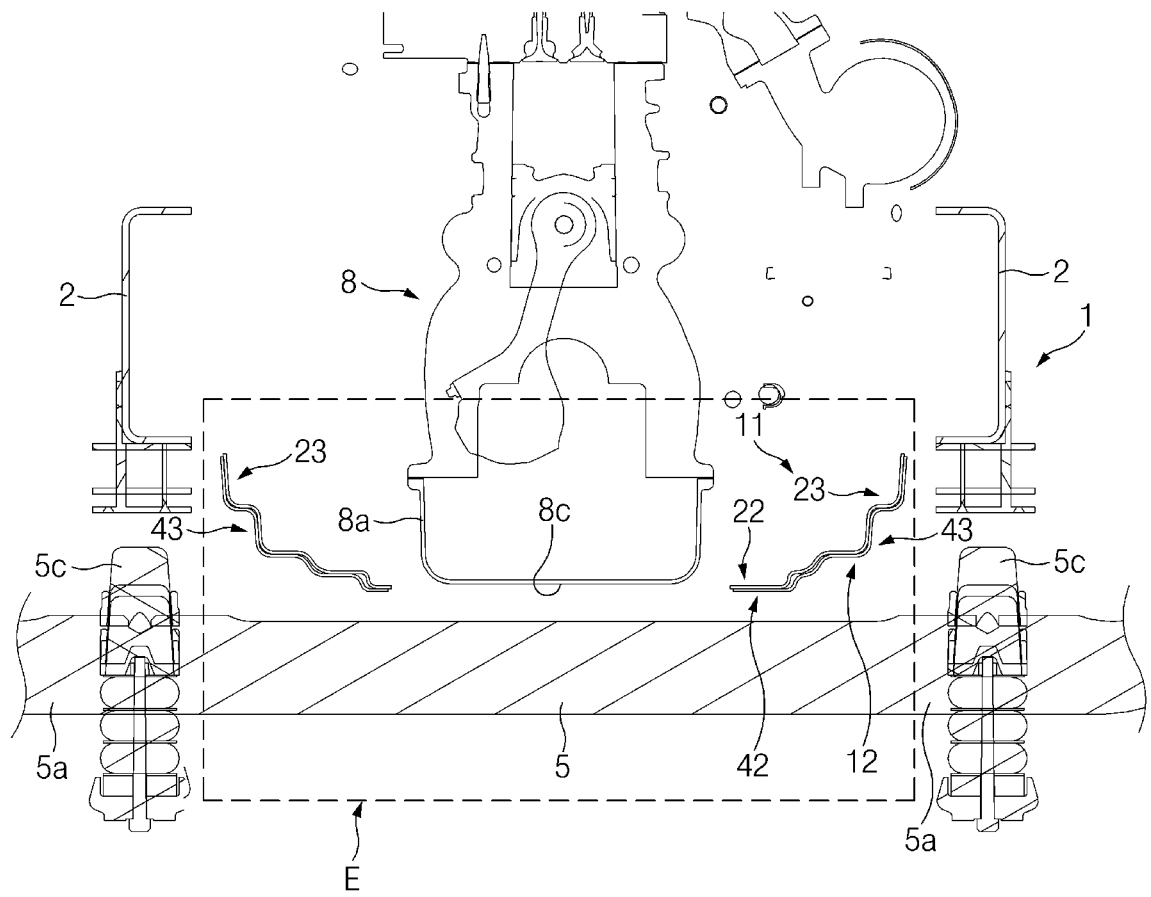
FIG. 5 illustrates a cross-sectional view, taken along line D-D of FIG. 3.

The first recessed wall 22 may be located between the moving component and at least a portion of a bottom surface of the lower portion of the powertrain component. At least a portion of the bottom surface of the lower portion of the powertrain component may be aligned with the first opening 25 of the first undercover 11. Referring to FIGS. 3 and 4, at least a portion of the recessed surface 8c of the oil pan 8a of the internal combustion engine 8 may be aligned with the first opening 25. In particular, the recessed surface 8c of the oil pan 8a may be close to the first opening 25.

Referring to FIG. 4, the first undercover 11 may further include a rear opening 26 spaced apart from the first opening 25. Specifically, the rear opening 26 may be aligned with the movement path of the tie rod 6, and the rear opening 26 may be located above the tie rod 6 so as not to interfere with the movement path of the tie rod 6. The tie rod 6 may be located behind the axle beam 5, and the tie rod 6 may be located lower than the axle beam 5. Accordingly, the rear opening 26 may be located behind the first opening 25, and the rear opening 26 may be located lower than the first opening 25.

Referring to FIG. 11, the first recessed wall 22 may include a pair of front peripheral walls 22a located on both side edges of the first opening 25, a pair of rear peripheral walls 22b located on both side edges of the rear opening 26, and a first reinforcing rib 27 located between the first opening 25 and the rear opening 26. The pair of front peripheral walls 22a may be connected to the pair of first side walls 23, respectively, and the pair of rear peripheral walls 22b may be connected to the pair of first side walls 23, respectively. The pair of front peripheral walls 22a and the first reinforcing rib 27 may surround the first opening 25, and the pair of rear peripheral walls 22b and the first reinforcing rib 27 may surround the rear opening 26. The first reinforcing rib 27 may extend in a width direction of the first undercover 11 between the first opening 25 and the rear opening 26, thereby improving stiffness with respect to the periphery of the first opening 25 and the periphery of the rear opening 26, and preventing the shaking, vibration, and the like of the first undercover 11 while the vehicle is driving.

The first undercover 11 may cover the other portions of the powertrain component excepting at least a portion of the bottom surface of the lower portion (the oil pan) of the powertrain component (the internal combustion engine) through the first opening 25 and the rear opening 26, and accordingly the lower portion of the powertrain component located above the moving components may be protected from moisture, foreign objects, etc.

Referring to FIG. 11, each first side wall 23 may extend in a longitudinal direction of the first undercover 11. The first side wall 23 may extend upwardly from the corresponding edge of the first recessed wall 22 and the corresponding edge of the first bottom wall 21.

Referring to FIG. 12, each first side wall 23 may be stepped from a top edge thereof toward the first recessed wall 22. A width w1 of the first recessed wall 22 may be less than a distance d1 between the top edges of the pair of first side walls 23. Accordingly, a width of a lower portion of the first undercover 11 may be less than that of an upper portion of the first undercover 11. Thus, the first undercover 11 may be easily inserted and mounted in a narrow space between the internal combustion engine 8 and the leaf spring 5c.

Specifically, each first side wall 23 may have a stair form which is stepped from the top edge thereof to the first recessed wall 22. The stair form may have a plurality of risers 31, 32, and 33 and a plurality of treads 34 and 35. An upper riser 31 may extend vertically, and an upper tread 34 may extend horizontally from a bottom edge of the upper riser 31. A middle riser 32 may extend vertically from an inner edge of the upper tread 34. A lower tread 35 may extend horizontally from a bottom edge of the middle riser 32, and a lower riser 33 may extend vertically from an inner edge of the lower tread 35. Each front peripheral wall 22a and each rear peripheral wall 22b may be directly connected to the lower riser 33 of the corresponding first side wall 23.

Second Undercover

Figure 7:
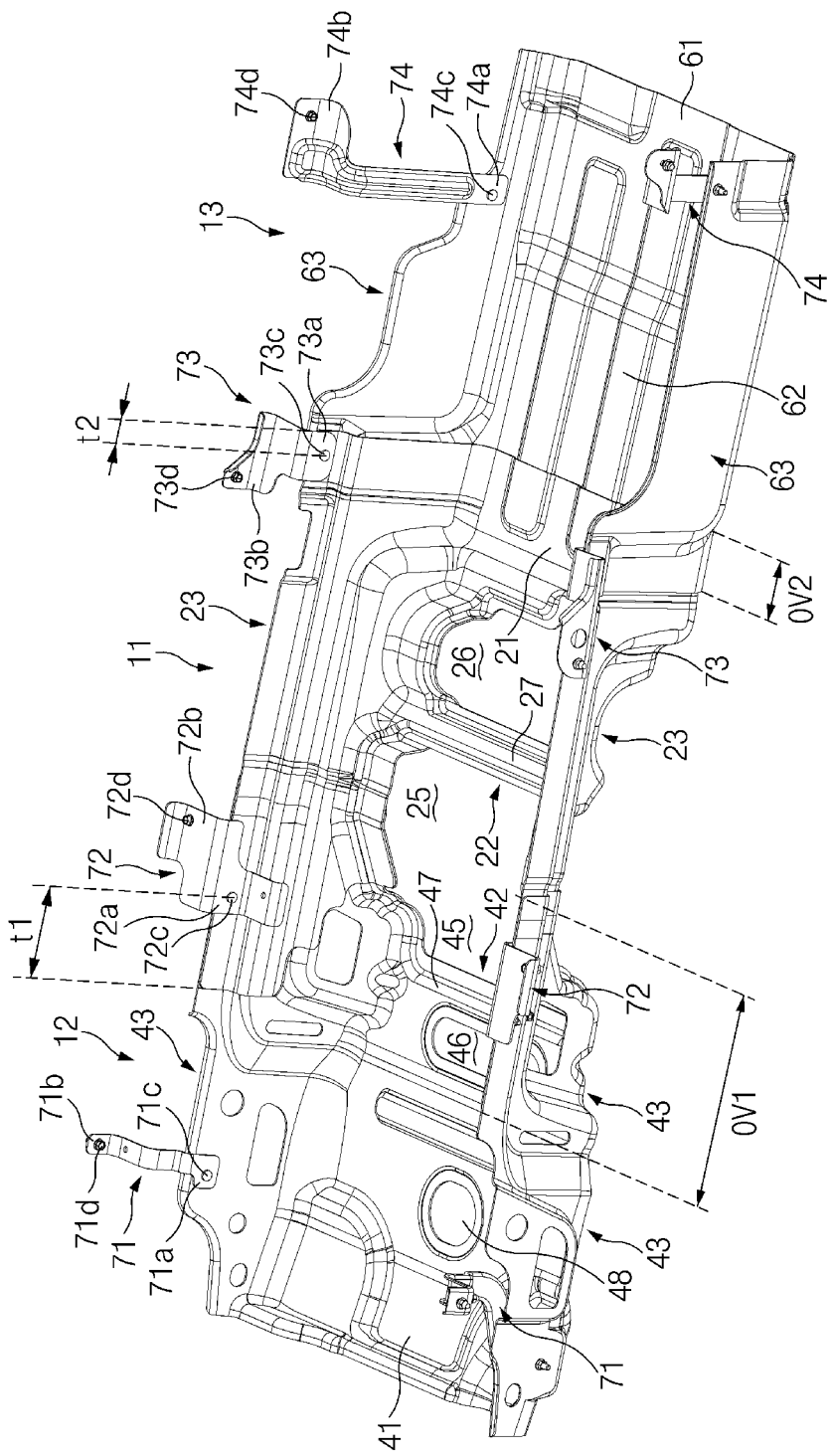
FIG. 7 illustrates a top perspective view of a first undercover, a second undercover, and a third undercover in a vehicle undercover structure according to an exemplary embodiment of the present disclosure.

Referring to FIGS. 7, 8, 9, and 10, a second undercover 12 may be located in front of the first undercover 11. Referring to FIG. 7, a rear portion of the second undercover 12 may be overlapped with the front portion of the first undercover 11 so that a first overlapped section OV1 may be formed between the front portion of the first undercover 11 and the rear portion of the second undercover 12. Referring to FIG. 8, the second undercover 12 may be located below the chassis frame 1 and be connected to the side rails 2 of the chassis frame 1 through brackets 71 and 72.

The second undercover 12 may cover the lower portion of the powertrain component exposed below the chassis frame 1. Referring to FIGS. 3 to 6, the second undercover 12 may cover the oil pan 8a of the internal combustion engine 8.

The second undercover 12 may be located above the moving component such as the axle beam 5, and accordingly the second undercover 12 may cover the lower portion of the powertrain component (the internal combustion engine) located above the moving component.

The second undercover 12 may have a shape which is complementary to that of the lower portion of the powertrain component so as not to interfere with the movement path of each moving component. Referring to FIG. 3, the shape of the second undercover 12 may be complementary to that of the recessed surface 8c of the oil pan 8a of the internal combustion engine 8.

A front portion of the second undercover 12 may face the front of the vehicle, and the rear portion of the second undercover 12 may face the rear of the vehicle.

Figure 13:
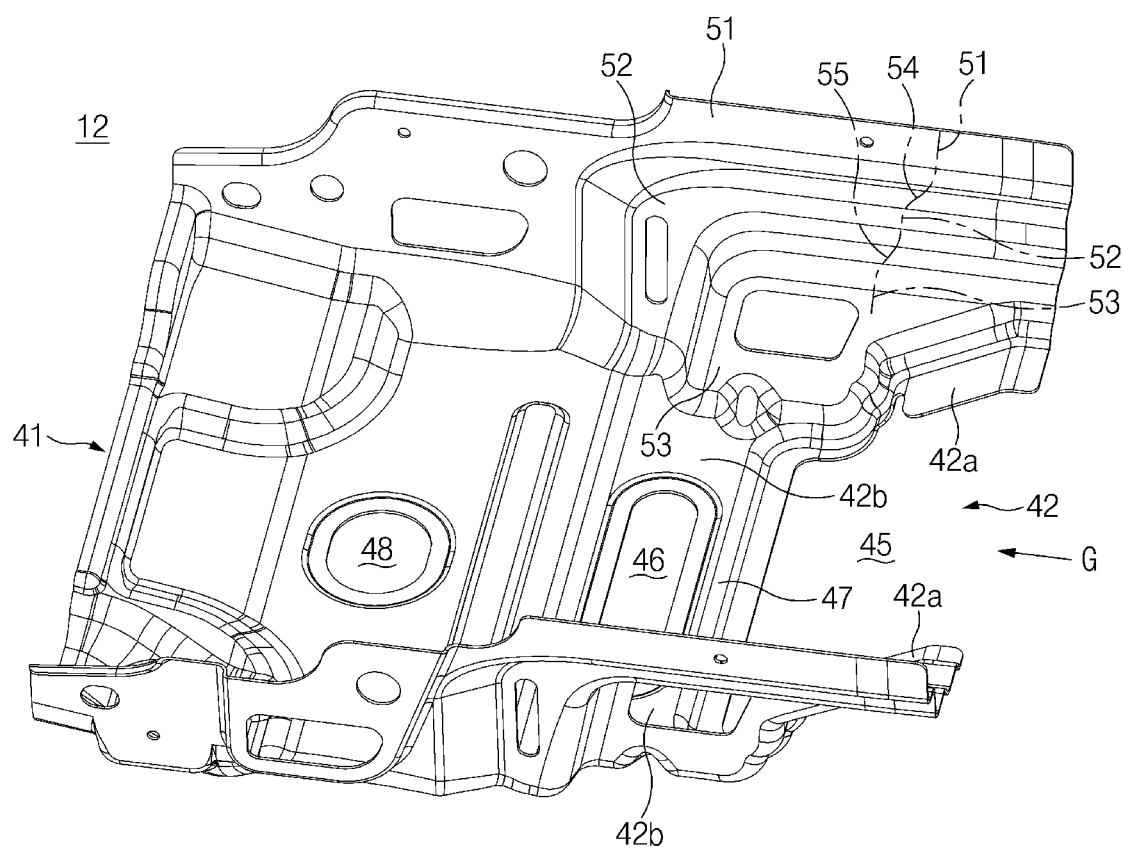
FIG. 13 illustrates a perspective view of a second undercover of a vehicle undercover structure according to an exemplary embodiment of the present disclosure.

Referring to FIG. 13, the second undercover 12 may include a second bottom wall 41, a second recessed wall 42 recessed upwardly from the second bottom wall 41, and a pair of second side walls 43 extending upwardly from both side edges of the second bottom wall 41 and both side edges of the second recessed wall 42.

Referring to FIG. 13, the second bottom wall 41 may be flat. The second bottom wall 41 may be provided on the front portion of the second undercover 12, and the second recessed wall 42 may be provided on the rear portion of the second undercover 12 so that the second recessed wall 42 may be located behind the second bottom wall 41. The second recessed wall 42 may be recessed upwardly from the second bottom wall 41 toward the chassis frame 1 so that the second recessed wall 42 may be located higher than the second bottom wall 41.

The second recessed wall 42 may be located between the moving component and at least a portion of the bottom surface of the lower portion of the powertrain component. The second recessed wall 42 may have a second opening 45, and the second opening 45 may be aligned with the movement path of the axle beam 5. As the second opening 45 is aligned with the movement path of the axle beam 5, the axle beam 5 may not come into contact with the second undercover 12 when the axle beam 5 is in the first upper limit position P1. That is, the second opening 45 may reliably prevent the axle beam 5 from coming into contact with the second undercover 12.

The second opening 45 of the second undercover 12 may be open to the first undercover 11, and the first opening 25 of the first undercover 11 may be open to the second opening 45 of the second undercover 12.

When the rear portion of the second undercover 12 is at least partially overlapped with the front portion of the first undercover 11, the second recessed wall 42 of the second undercover 12 may be at least partially overlapped with the first recessed wall 22 of the first undercover 11, the second opening 45 of the second undercover 12 may be at least partially overlapped with the first opening 25 of the first undercover 11, and each second side wall 43 of the second undercover 12 may be at least partially overlapped with the corresponding first side wall 23 of the first undercover 11.

Figure 6:
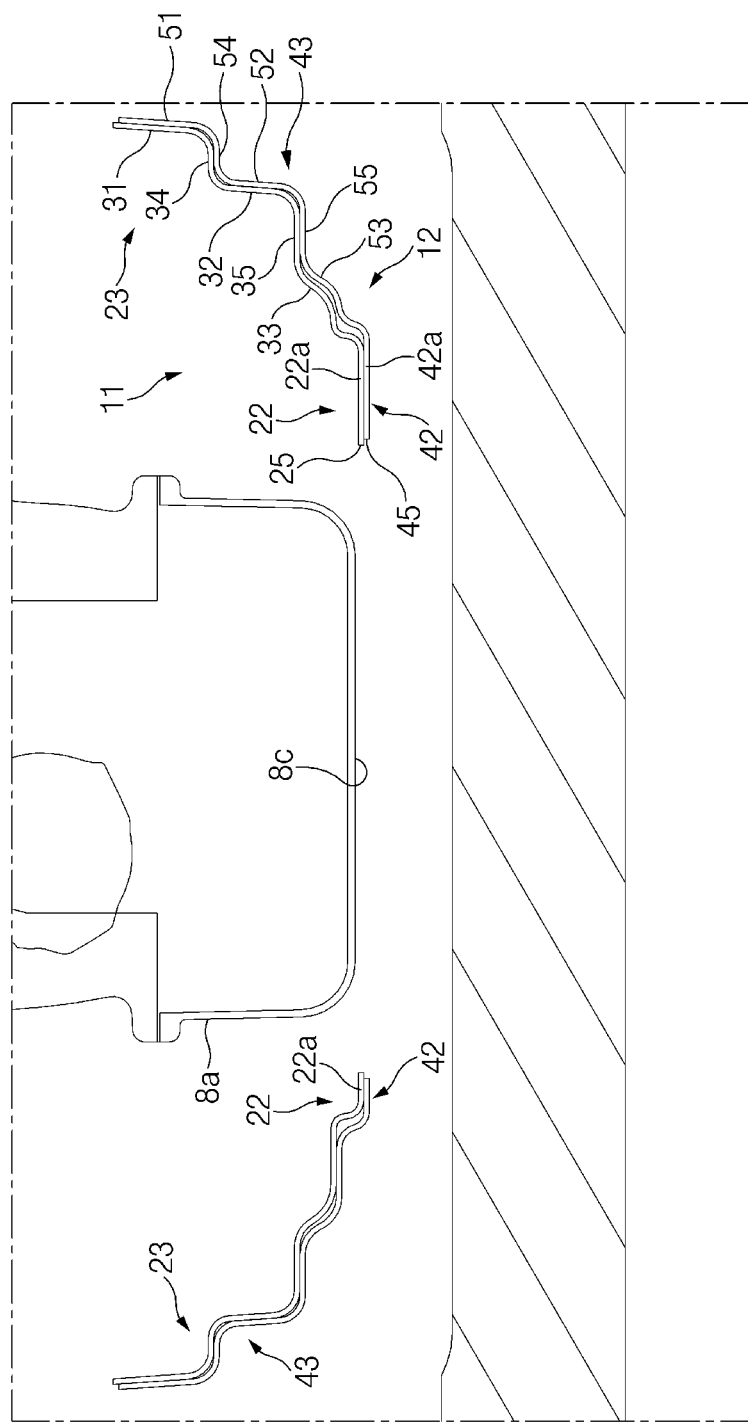
FIG. 6 illustrates an enlarged view of portion E of FIG. 5.

At least a portion of the bottom surface of the lower portion of the powertrain component located above the moving component may be aligned with the overlapped first and second openings 25 and 45. Referring to FIG. 6, at least a portion of the recessed surface 8c of the oil pan 8a may be aligned with the overlapped first and second openings 25 and 45. In particular, the recessed surface 8c of the oil pan 8a may be close to the overlapped first and second openings 25 and 45.

Referring to FIG. 13, the second recessed wall 42 may further include a front opening 46 spaced apart from the second opening 45. The front opening 46 may be located below the front portion of the powertrain component. The front opening 46 may be located below the oil pan 8a of the internal combustion engine 8, and the front opening 46 may be used for maintenance of the oil pan 8a of the internal combustion engine 8.

Referring to FIG. 13, the second recessed wall 42 may include a pair of rear peripheral walls 42a located on both side edges of the second opening 45, a pair of front peripheral walls 42b located on both side edges of the front opening 46, and a second reinforcing rib 47 located between the second opening 45 and the front opening 46. The pair of rear peripheral walls 42a may be connected to the pair of second side walls 43, respectively, and the pair of front peripheral walls 42b may be connected to the pair of second side walls 43, respectively. The pair of rear peripheral walls 42a and the second reinforcing rib 47 may surround the second opening 45, and the pair of front peripheral walls 42b and the second reinforcing rib 47 may surround the front opening 46. The second reinforcing rib 47 may extend in a width direction of the second undercover 12 between the second opening 45 and the front opening 46, thereby improving stiffness with respect to the periphery of the second opening 45 and the periphery of the front opening 46, and preventing the shaking, vibration, and the like of the second undercover 12 while the vehicle is driving.

The second undercover 12 may cover the other portions of the powertrain component excepting at least a portion of the bottom surface of the lower portion (the oil pan) of the powertrain component (the internal combustion engine) through the second opening 45 and the front opening 46, and accordingly the lower portion of the powertrain component located above the moving component may be protected from moisture, foreign objects, etc.

Referring to FIG. 13, each second side wall 43 may extend in a longitudinal direction of the second undercover 12. The second side wall 43 may extend upwardly from the corresponding edge of the second recessed wall 42 and the corresponding edge of the second bottom wall 41.

Figure 14:
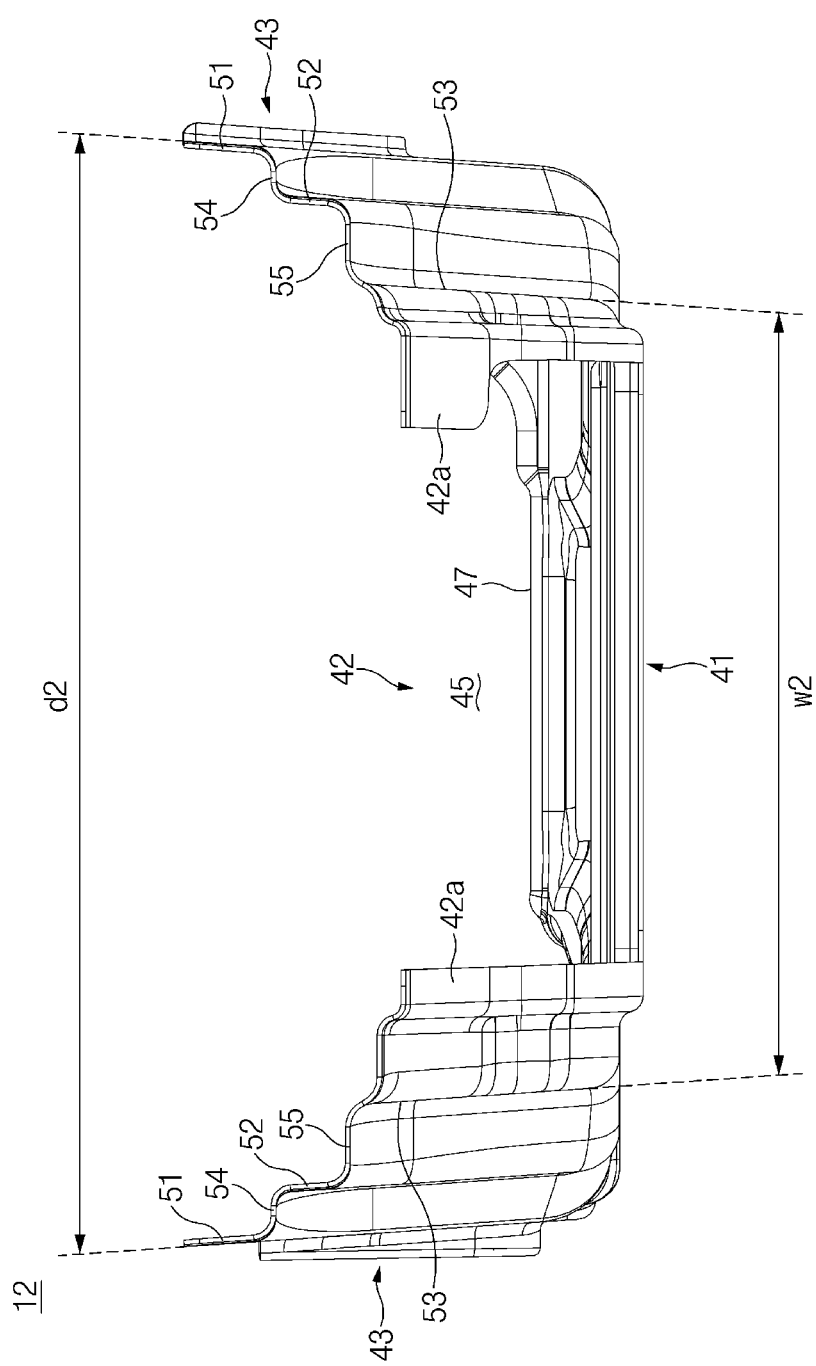
FIG. 14 illustrates a view which is viewed in a direction indicated by arrow G of FIG. 13.

Referring to FIG. 14, each second side wall 43 may be stepped from a top edge thereof toward the second recessed wall 42. A width w2 of the second recessed wall 42 may be less than a distance d2 between the top edges of the pair of second side walls 43. Accordingly, a width of a lower portion of the second undercover 12 may be less than that of an upper portion of the second undercover 12. Thus, the second undercover 12 may be easily inserted and mounted in a narrow space between the internal combustion engine 8 and the leaf spring 5c.

Specifically, each second side wall 43 may have a stair form which is stepped from the top edge thereof to the second recessed wall 42. The stair form may have a plurality of risers 51, 52, and 53 and a plurality of treads 54 and 55. An upper riser 51 may extend vertically, and an upper tread 54 may extend horizontally from a bottom edge of the upper riser 51. A middle riser 52 may extend vertically from an inner edge of the upper tread 54. A lower tread 55 may extend horizontally from a bottom edge of the middle riser 52, and a lower riser 53 may extend vertically from an inner edge of the lower tread 55. Each rear peripheral wall 42a and each front peripheral wall 42b may be directly connected to the lower riser 53 of the corresponding second side wall 43.

Third Undercover

Referring to FIGS. 7, 8, 9, and 10, a third undercover 13 may be located behind the first undercover 11. Referring to FIG. 7, a front portion of the third undercover 13 may be overlapped with the rear portion of the first undercover 11 so that a second overlapped section OV2 may be formed between the rear portion of the first undercover 11 and the front portion of the third undercover 13. The third undercover 13 may be located below the chassis frame 1 and be connected to the side rails 2 of the chassis frame 1 through brackets and/or the like.

The third undercover 13 may cover a lower portion of another powertrain component exposed below the chassis frame 1. Referring to FIGS. 2 and 3, the third undercover 13 may cover the lower portion of the transmission 9 located behind the internal combustion engine 8.

The front portion of the third undercover 13 may face the front of the vehicle, and a rear portion of the third undercover 13 may face the rear of the vehicle.

Figure 15:
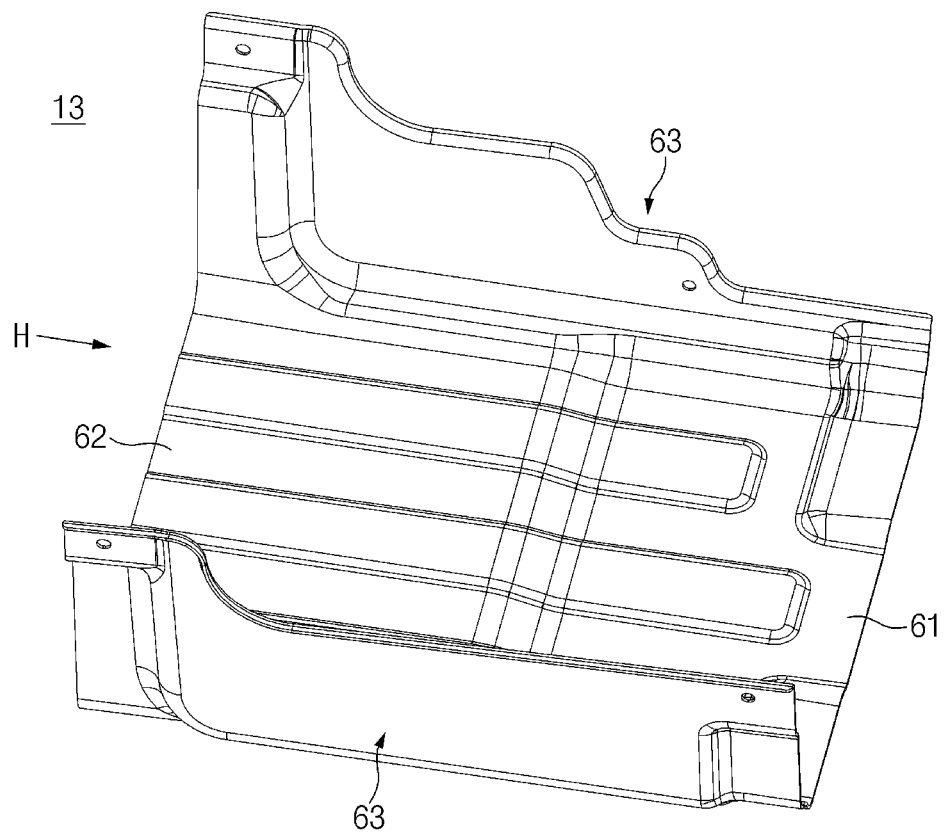
FIG. 15 illustrates a perspective view of a third undercover of a vehicle undercover structure according to an exemplary embodiment of the present disclosure.
Figure 16:
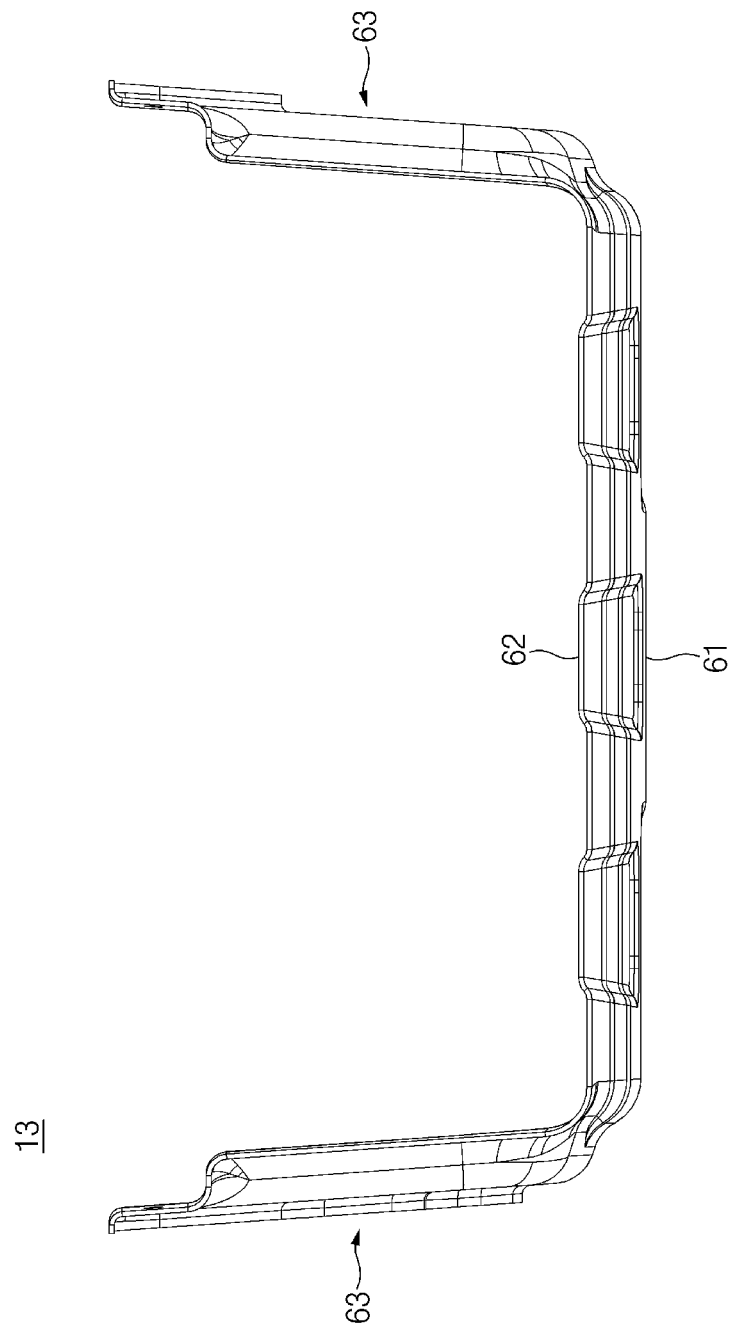
FIG. 16 illustrates a view which is viewed in a direction indicated by arrow H of FIG. 15.

Referring to FIGS. 15 and 16, the third undercover 13 may include a third bottom wall 61, a third recessed wall 62 recessed upwardly from the third bottom wall 61, and a pair of third side walls 63 extending upwardly from both side edges of the third bottom wall 61 and both side edges of the third recessed wall 62.

Referring to FIG. 15, the third bottom wall 61 may be flat. The third bottom wall 61 may be provided on the rear portion of the third undercover 13, and the third recessed wall 62 may be provided on the front portion of the third undercover 13 so that the third recessed wall 62 may be located in front of the third bottom wall 61. The third recessed wall 62 may be recessed upwardly from the third bottom wall 61 toward the chassis frame 1 so that the third recessed wall 62 may be located higher than the third bottom wall 61.

When the front portion of the third undercover 13 is at least partially overlapped with the rear portion of the first undercover 11, the third recessed wall 62 of the third undercover 13 may be at least partially overlapped with the first bottom wall 21 of the first undercover 11.

Referring to FIG. 15, each third side wall 63 may extend in a longitudinal direction of the third undercover 13. The third side wall 63 may extend upwardly from the corresponding edge of the third recessed wall 62 and the corresponding edge of the third bottom wall 61.

Front Mounting Bracket

The second undercover 12 may be connected to the side rails 2 of the chassis frame 1 through a pair of front mounting brackets 71 attached to the front portion thereof. Referring to FIG. 7, each front mounting bracket 71 may include a cover-side attachment portion 71a and a chassis-side attachment portion 71b. Referring to FIG. 8, the cover-side attachment portion 71a may be attached to the second undercover 12 through a cover-side fastener 71c, and the chassis-side attachment portion 71b may be attached to the side rail 2 through a chassis-side fastener 71d.

First Middle Mounting Bracket

The first overlapped section OV1 between the front portion of the first undercover 11 and the rear portion of the second undercover 12 may be connected to the side rails 2 of the chassis frame 1 through a pair of first middle mounting brackets 72. Referring to FIG. 7, each first middle mounting bracket 72 may include a cover-side attachment portion 72a and a chassis-side attachment portion 72b. Referring to FIG. 8, the cover-side attachment portion 72a may be attached to the first overlapped section OV1 through a cover-side fastener 72c, and the chassis-side attachment portion 72b may be attached to the side rail 2 through a chassis-side fastener 72d.

A hole provided in a front portion of the first side wall 23 of the first undercover 11 may be aligned with a hole provided in a rear portion of the second side wall 43 of the second undercover 12, and the cover-side fastener 72c may be mounted through the hole of the first undercover 11 and the hole of the second undercover 12.

Referring to FIG. 7, each first middle mounting bracket 72 may be spaced apart from a front end of the first undercover 11 by a predetermined distance. In particular, the cover-side fastener 72c may be spaced apart from the front end of the first undercover 11 by a first marginal distance t1. Even when the mounting positions of chassis components change according to the specifications of vehicles, the first middle mounting bracket 72 may be prevented from interfering with the chassis components due to the first marginal distance t1, which may facilitate access of fastening tools.

According to an exemplary embodiment, a plurality of holes may be provided in the front portion of the first side wall 23 of the first undercover 11 and be spaced apart from each other by a predetermined gap, and a plurality of holes may be provided in the rear portion of the second side wall 43 of the second undercover 12 and be spaced apart from each other by a predetermined gap. The plurality of holes provided in the front portion of the first side wall 23 of the first undercover 11 may be aligned with the plurality of holes provided in the rear portion of the second side wall 43 of the second undercover 12, respectively, so that the first marginal distance t1 may vary in accordance with changes in the mounting positions of the chassis components.

Second Middle Mounting Bracket

The second overlapped section OV2 between the front portion of the third undercover 13 and the rear portion of the first undercover 11 may be connected to the side rails 2 of the chassis frame 1 through a pair of second middle mounting brackets 73. Referring to FIG. 7, each second middle mounting bracket 73 may include a cover-side attachment portion 73a and a chassis-side attachment portion 73b. Referring to FIG. 8, the cover-side attachment portion 73a may be attached to the second overlapped section OV2 through a cover-side fastener 73c, and the chassis-side attachment portion 73b may be attached to the side rail 2 through a chassis-side fastener 73d.

A hole provided in a front portion of the third side wall 63 of the third undercover 13 may be aligned with a hole provided in a rear portion of the first side wall 23 of the first undercover 11, and the cover-side fastener 73c may be mounted through the hole of the first undercover 11 and the hole of the third undercover 13.

Each second middle mounting bracket 73 may be spaced apart from a rear end of the first undercover 11 by a predetermined distance. Specifically, the cover-side fastener 73c may be spaced apart from the rear end of the first undercover 11 by a second marginal distance t2. Even when the mounting positions of chassis components change according to the specifications of vehicles, the second middle mounting bracket 73 may be prevented from interfering with the chassis components due to the second marginal distance t2, which may facilitate access of fastening tools.

According to an exemplary embodiment, a plurality of holes may be provided in the rear portion of the first side wall 23 of the first undercover 11 and be spaced apart from each other by a predetermined gap, and a plurality of holes may be provided in the front portion of the third side wall 63 of the third undercover 13 and be spaced apart from each other by a predetermined gap. The plurality of holes provided in the rear portion of the first side wall 23 of the first undercover 11 may be aligned with the plurality of holes provided in the front portion of the third side wall 63 of the third undercover 13, respectively, so that the second marginal distance t2 may vary in accordance with changes in the mounting positions of the chassis components.

Rear Mounting Bracket

The third undercover 13 may be connected to the side rails 2 of the chassis frame 1 through a pair of rear mounting brackets 74 attached to the front portion thereof. Referring to FIG. 7, each rear mounting bracket 74 may include a cover-side attachment portion 74a and a chassis-side attachment portion 74b. Referring to FIG. 8, the cover-side attachment portion 74a may be attached to the third undercover 13 through a cover-side fastener 74c, and the chassis-side attachment portion 74b may be attached to the side rail 2 through a chassis-side fastener 74d.

According to a specific exemplary embodiment, the first undercover 11, the second undercover 12, and the third undercover 13 may be made of a synthetic resin material such as plastic. Accordingly, the weight of the undercovers 11, 12, and 13 may be relatively reduced.

According to a specific exemplary embodiment, the front mounting bracket 71, the first middle mounting bracket 72, the second middle mounting bracket 73, and the rear mounting bracket 74 may be made of a metal material such as steel. Accordingly, the undercovers 11, 12, and 13 made of a synthetic resin material may be firmly mounted on the side rails 2 of the chassis frame 1 through the mounting brackets 71, 72, 73, and 74 made of a metal material.

Assembly Sequence of First Undercover, Second Undercover, and Third Undercover

FIGS. 17 to 20 illustrate a process of assembling the first undercover 11, the second undercover 12, and the third undercover 13 with respect to the chassis frame 1.

Figure 17:
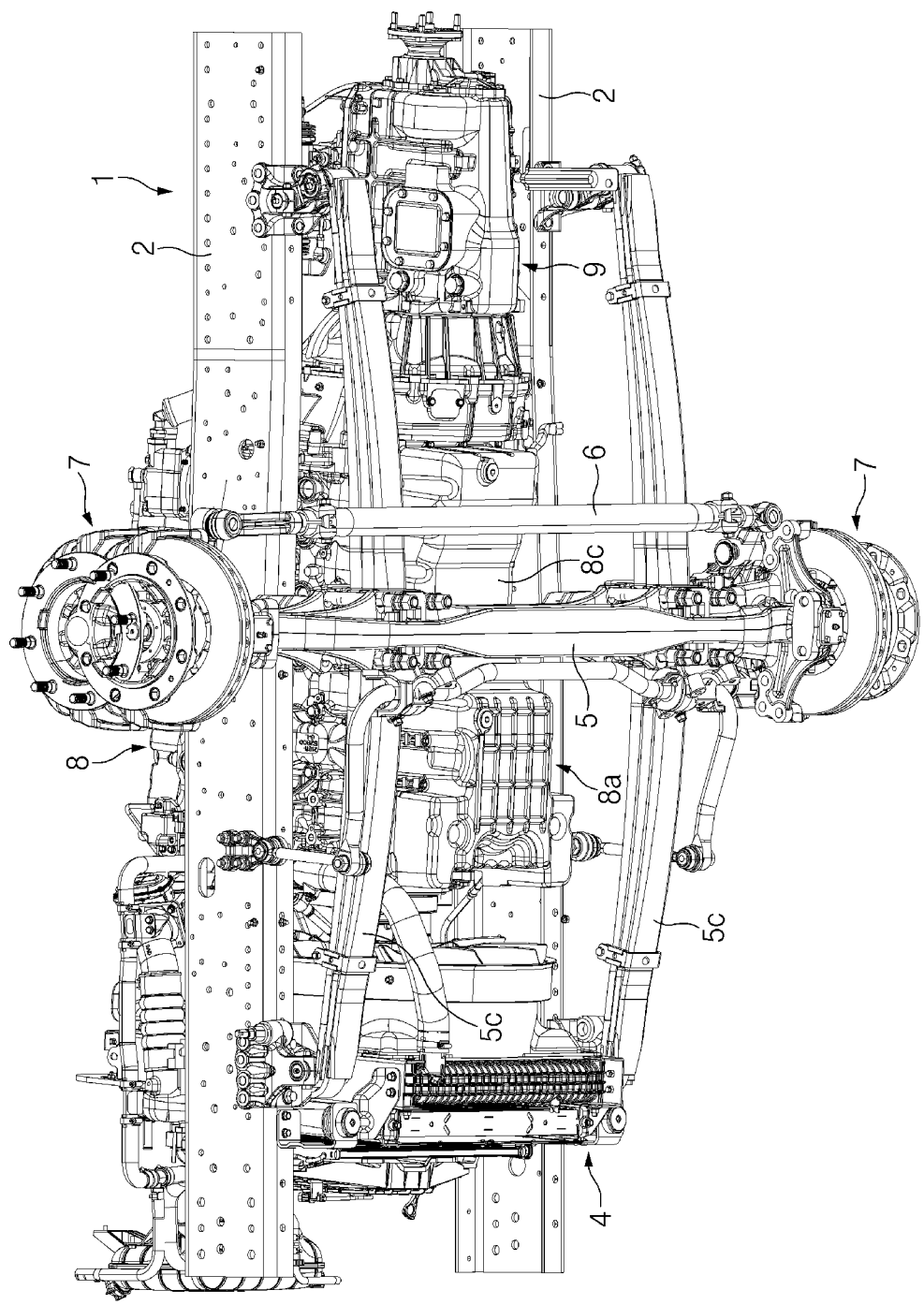
FIG. 17 illustrates a state before a first undercover, a second undercover, and a third undercover are mounted on a chassis frame of a vehicle.

Referring to FIG. 17, various components such as the radiator 4, the internal combustion engine 8, and the transmission 9 may be mounted on the side rails 2 of the chassis frame 1.

Figure 18:
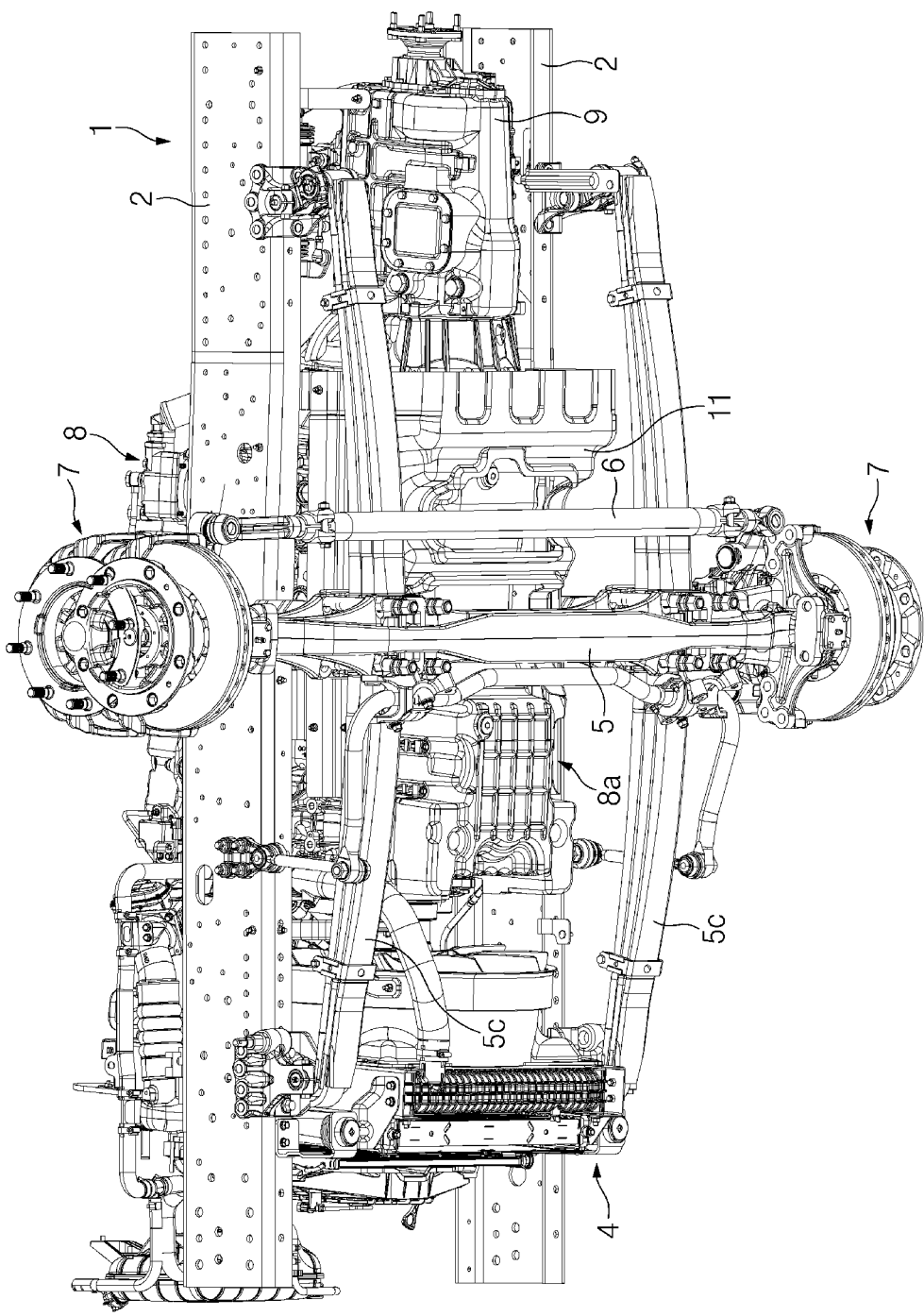
FIG. 18 illustrates a state in which a first undercover is mounted on a chassis frame of a vehicle.

Referring to FIG. 18, the first undercover 11 may be mounted on the side rails 2 of the chassis frame 1 so that the first undercover 11 may cover the oil pan 8a of the internal combustion engine 8.

Figure 19:
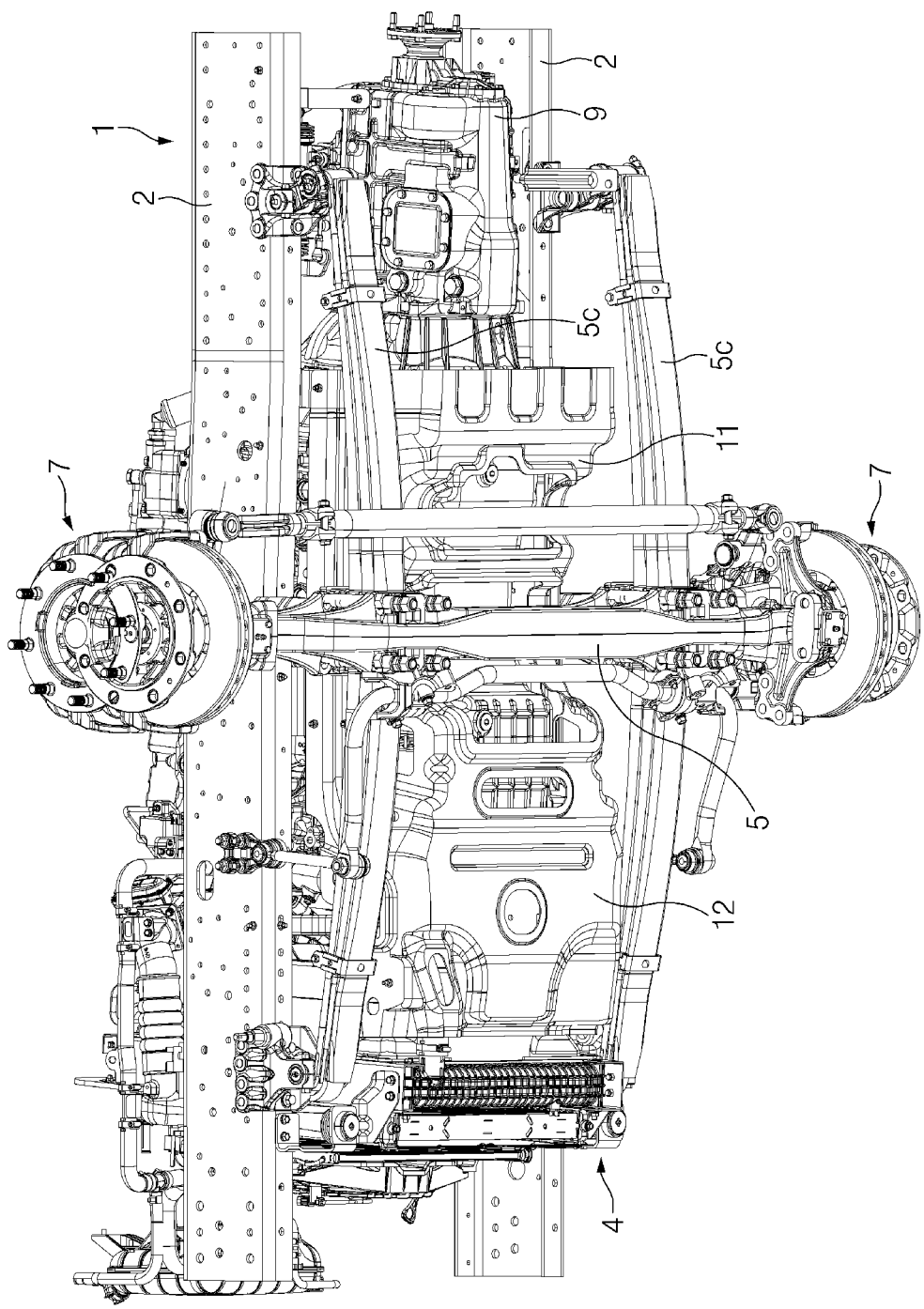
FIG. 19 illustrates a state in which a first undercover and a second undercover are mounted on a chassis frame of a vehicle.

After the first undercover 11 is mounted, the second undercover 12 may be mounted on the side rails 2 of the chassis frame 1 to be located in front of the first undercover 11 as illustrated in FIG. 19, and accordingly the first undercover 11 and the second undercover 12 may entirely cover the lower portion of the internal combustion engine 8.

Figure 20:
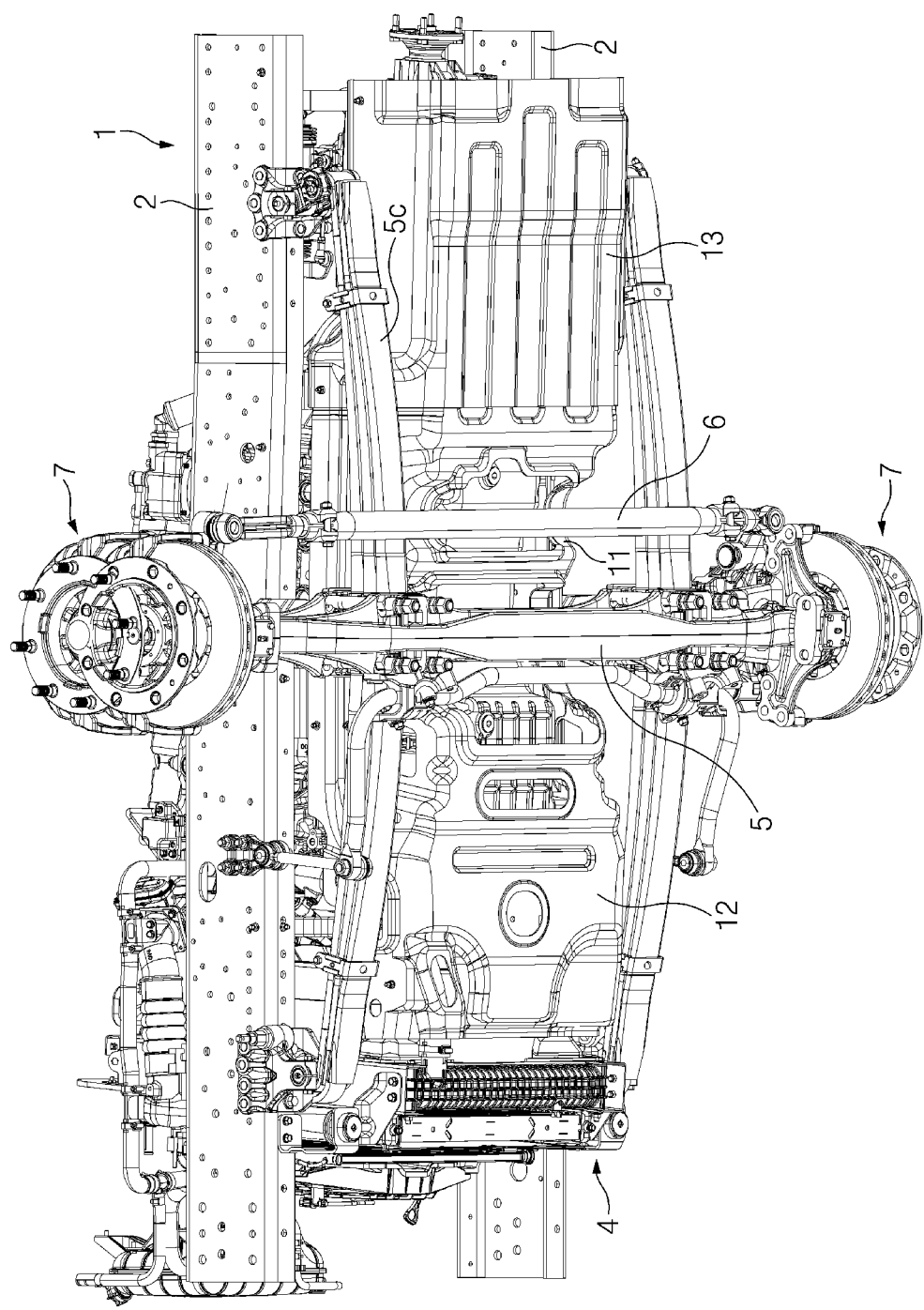
FIG. 20 illustrates a state in which a first undercover, a second undercover, and a third undercover are mounted on a chassis frame of a vehicle.

After the second undercover 12 is mounted, the third undercover 13 may be mounted on the side rails 2 of the chassis frame 1 to be located behind the first undercover 11 as illustrated in FIG. 20, and accordingly the third undercover 13 may cover the lower portion of the transmission 9.

As described above, the first undercover 11 and the second undercover 12 may sufficiently cover the oil pan 8a of the internal combustion engine 8 exposed below the chassis frame 1 without interfering with the movement paths of the axle beam 5 and the tie rod 6, thereby preventing moisture and foreign objects from scattering onto the oil pan 8a and preventing rust of the oil pan 8a, and thus product quality may be improved.

In addition, the first recessed wall 22 of the first undercover 11 and the second recessed wall 42 of the second undercover 12 may be designed to not interfere with the movement path of the axle beam 5 and the movement path of the tie rod 6 so that the maximum bumping of the axle beam 5 and the tie rod 6 may be allowable, and accordingly suspension characteristics of the axle beam 5 and the tie rod 6 may be maximized, and the generation of noise may be prevented.

The first opening 25 of the first undercover 11 and the second opening 45 of the second undercover 12 may be aligned with the movement path of the axle beam 5, and the rear opening 26 of the first undercover 11 may be aligned with the movement path of the tie rod 6 so that the movement path of the axle beam 5 may be sufficiently secured. In addition, the rear opening 26 of the first undercover 11 may be aligned with the movement path of the tie rod 6 so that the movement path of the tie rod 6 may be sufficiently secured. Furthermore, the openings 25 and 26 of the first undercover 11 and the openings 45 and 46 of the second undercover 12 may be used for draining oil from the oil pan 8*a*.

The first undercover 11, the second undercover 12, and the third undercover 13 may entirely cover the components exposed below the chassis frame 1, thereby improving exterior styling.

In particular, the front portion of the first undercover 11 and the rear portion of the second undercover 12 may overlap and the rear portion of the first undercover 11 and the front portion of the third undercover 13 may overlap so that the first undercover 11, the second undercover 12, and the third undercover 13 may be firmly mounted on the chassis frame 1. Thus, mounting stiffness of the first undercover 11, the second undercover 12, and the third undercover 13 may be improved.

As set forth above, the vehicle undercover structure according to exemplary embodiments of the present disclosure may cover the lower portions of the powertrain components adjacent to the moving components which are movable up and down below the chassis frame and be designed to not interfere with the movement paths of the moving components, thereby protecting the lower portions of the powertrain components located above the moving components from moisture, foreign objects, etc. Thus, the quality of rust prevention with respect to the lower portions of the powertrain components may be improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle undercover structure comprising:
    a chassis frame;
    a moving component that is movable up and down below the chassis frame; and
    a first undercover connected to the chassis frame and located above the moving component, wherein the first undercover comprises:
        a first bottom wall;
        a first recessed wall recessed from the first bottom wall toward the chassis frame, wherein the first recessed wall is designed to not interfere with a movement path of the moving component,
        wherein the first recessed wall has a first opening aligned with the movement path of the moving component; and
        a pair of first side walls extending from both side edges of the first bottom wall and both side edges of the first recessed wall toward the chassis frame, respectively.

2. The vehicle undercover structure according to claim 1, further comprising a powertrain component mounted on the chassis frame, wherein a lower portion of the powertrain component is exposed below the chassis frame and a portion of a bottom surface of the lower portion of the powertrain component is aligned with the first opening.

3. The vehicle undercover structure according to claim 1, wherein the first recessed wall further comprises:
    a rear opening spaced apart from the first opening and located behind the first opening; and
    a reinforcing rib extending in a width direction of the first recessed wall between the first opening and the rear opening.

4. The vehicle undercover structure according to claim 1, wherein:
    a width of the first recessed wall is less than a distance between top edges of the pair of first side walls; and
    each first side wall is stepped from the top edge thereof toward the first recessed wall.

5. The vehicle undercover structure according to claim 1, wherein:
    each first side wall has a stair form that is stepped from a top edge thereof to the first recessed wall; and
    the stair form has a plurality of risers and a plurality of treads.

6. A vehicle undercover structure comprising:
    a chassis frame;
    a moving component that is movable up and down below the chassis frame;
    a first undercover connected to the chassis frame and located above the moving component, wherein the first undercover comprises:
        a first bottom wall;
        a first recessed wall recessed from the first bottom wall toward the chassis frame, wherein the first recessed wall is designed to not interfere with a movement path of the moving component,
        wherein the first recessed wall has a first opening aligned with the movement path of the moving component; and
        a pair of first side walls extending from both side edges of the first bottom wall and both side edges of the first recessed wall toward the chassis frame, respectively; and
    a second undercover connected to a front portion of the first undercover, wherein a rear portion of the second undercover is overlapped with the front portion of the first undercover.

7. The vehicle undercover structure according to claim 6, wherein an overlapped section between the front portion of the first undercover and the rear portion of the second undercover is connected to the chassis frame through a mounting bracket.

8. The vehicle undercover structure according to claim 7, wherein the mounting bracket comprises a cover-side attachment portion attached to the overlapped section through a cover-side fastener and a chassis-side attachment portion attached to the chassis frame through a chassis-side fastener.

9. The vehicle undercover structure according to claim 8, wherein the cover-side fastener is spaced apart from a front end of the first undercover by a predetermined marginal distance.

10. The vehicle undercover structure according to claim 6, wherein the second undercover comprises:
- a second bottom wall;
- a second recessed wall recessed from the second bottom wall toward the chassis frame, wherein the second recessed wall is designed to not interfere with the movement path of the moving component; and
- a pair of second side walls extending from both side edges of the second bottom wall and both side edges of the second recessed wall toward the chassis frame, respectively.

11. The vehicle undercover structure according to claim 10, wherein the second recessed wall has a second opening aligned with the movement path of the moving component.

12. The vehicle undercover structure according to claim 10, wherein:
- a width of the second recessed wall is less than a distance between top edges of the pair of second side walls; and
- each second side wall is stepped from the top edge thereof toward the second recessed wall.

13. The vehicle undercover structure according to claim 10, wherein:
- each second side wall has a stair form that is stepped from a top edge thereof to the second recessed wall; and
- the stair form has a plurality of risers and a plurality of treads.

14. The vehicle undercover structure according to claim 10, further comprising a third undercover connected to a rear portion of the first undercover, wherein a front portion of the third undercover is at least partially overlapped with the rear portion of the first undercover.

15. The vehicle undercover structure according to claim 14, wherein:
- an overlapped section between the front portion of the third undercover and the rear portion of the first undercover is connected to the chassis frame through a mounting bracket;
- the mounting bracket comprises a cover-side attachment portion attached to the overlapped section through a cover-side fastener and a chassis-side attachment portion attached to the chassis frame through a chassis-side fastener; and
- the cover-side fastener is spaced apart from a rear end of the first undercover by a predetermined marginal distance.

16. A vehicle undercover structure comprising:
- a chassis frame;
- a moving component that is movable up and down below the chassis frame;
- a first undercover connected to the chassis frame and located above the moving component, wherein the first undercover comprises:
  - a first bottom wall;
  - a first recessed wall recessed from the first bottom wall toward the chassis frame, wherein the first recessed wall is designed to not interfere with a movement path of the moving component,
  - wherein the first recessed wall has a first opening aligned with the movement path of the moving component; and
  - a pair of first side walls extending from both side edges of the first bottom wall and both side edges of the first recessed wall toward the chassis frame, respectively; and
- a third undercover connected to a rear portion of the first undercover, wherein a front portion of the third undercover is at least partially overlapped with the rear portion of the first undercover.

17. The vehicle undercover structure according to claim 16, wherein an overlapped section between the front portion of the third undercover and the rear portion of the first undercover is connected to the chassis frame through a mounting bracket.

18. The vehicle undercover structure according to claim 17, wherein the mounting bracket comprises a cover-side attachment portion attached to the overlapped section through a cover-side fastener and a chassis-side attachment portion attached to the chassis frame through a chassis-side fastener.

19. The vehicle undercover structure according to claim 18, wherein the cover-side fastener is spaced apart from a rear end of the first undercover by a predetermined marginal distance.

* * * * *